(12) United States Patent
Nishimura et al.

(10) Patent No.: US 8,130,627 B2
(45) Date of Patent: Mar. 6, 2012

(54) OPTICAL DISC PRODUCTION APPARATUS

(75) Inventors: Hironobu Nishimura, Tokorozawa (JP); Masahiko Kotoyori, Tokyo (JP); Masahiro Nakamura, Saitama (JP); Kazuya Hisada, San Pedro, CA (US); Eiji Ohno, Osaka (JP); Keiji Nishikiori, Yawata (JP)

(73) Assignees: Origin Electric Company, Limited, Tokyo (JP); Panasonic Corporation, Osaka (JP)

( * ) Notice: Subject to any disclaimer, the term of this patent is extended or adjusted under 35 U.S.C. 154(b) by 1079 days.

(21) Appl. No.: 11/665,589

(22) PCT Filed: Mar. 10, 2006

(86) PCT No.: PCT/JP2006/304763
§ 371 (c)(1),
(2), (4) Date: Apr. 17, 2007

(87) PCT Pub. No.: WO2006/095859
PCT Pub. Date: Sep. 14, 2006

(65) Prior Publication Data
US 2007/0291630 A1    Dec. 20, 2007

(30) Foreign Application Priority Data

| Mar. 11, 2005 | (JP) | 2005-069473 |
| Jun. 15, 2005 | (JP) | 2005-175629 |
| Jun. 15, 2005 | (JP) | 2005-175630 |
| Jun. 15, 2005 | (JP) | 2005-175631 |

(51) Int. Cl.
*G11B 7/00* (2006.01)
*B29D 11/00* (2006.01)

(52) U.S. Cl. .................... 369/272.1; 428/64.4; 264/1.33

(58) Field of Classification Search ............... 369/275.1, 369/275.2, 275.4, 272.1, 280, 285; 428/64.1, 428/64.4, 64.8; 264/1.33, 232, 340; 358/296, 358/1.1
See application file for complete search history.

(56) References Cited

U.S. PATENT DOCUMENTS
5,764,606 A    6/1998    Fukumoto et al.
(Continued)

FOREIGN PATENT DOCUMENTS
EP    1434211 A1    6/2004
(Continued)

*Primary Examiner* — Nabil Z Hindi
(74) *Attorney, Agent, or Firm* — Harness, Dickey & Pierce, P.L.C.

(57) ABSTRACT

An optical disk manufacturing apparatus which employs first and second signal layer forming mechanisms, a reflection layer forming mechanism, a light transmission layer forming mechanism and first, second and third transportation mechanisms. The apparatus further includes a liquid material supplying mechanism, a first and second rotation mechanism, first and second hardening light radiation apparatuses, a ring-shaped mask portion, and a mask transfer mechanism.

15 Claims, 17 Drawing Sheets

U.S. PATENT DOCUMENTS

| | | |
|---|---|---|
| 6,821,459 B1 * | 11/2004 | Usami .................... 264/1.33 |
| 2002/0110054 A1 | 8/2002 | Ono et al. |
| 2005/0022224 A1 | 1/2005 | Yamaga et al. |

FOREIGN PATENT DOCUMENTS

| | | |
|---|---|---|
| JP | 05-277427 A | 10/1993 |
| JP | 08-131928 A | 5/1996 |
| JP | 09-063127 A | 3/1997 |
| JP | 09-167382 A | 6/1997 |
| JP | 10-188374 | 7/1998 |
| JP | 11-066647 | 3/1999 |
| JP | 11-073691 A | 3/1999 |
| JP | 2000-357347 A | 12/2000 |
| JP | 2002-197731 | 7/2002 |
| JP | 2002-197735 A | 7/2002 |
| JP | 2002-245692 | 8/2002 |
| JP | 2002-358695 A | 12/2002 |
| JP | 2003-67986 A | 3/2003 |
| JP | 2003-067990 A | 3/2003 |
| JP | 2004-47018 A | 2/2004 |
| JP | 2004-220750 | 8/2004 |
| JP | 2004-247014 A | 9/2004 |
| JP | 2004-334991 A | 11/2004 |
| KR | 10-2002-0006205 A | 1/2002 |
| WO | 03/021590 A1 | 3/2003 |

* cited by examiner

51; MASK DRIVING MECHANISM

OPTICAL DISC PRODUCTION APPARATUS

TECHNICAL FIELD

The present invention relates to an optical disc production apparatus, and especially relates to an apparatus for producing an optical disc which achieves high-density recording.

Priority is claimed on Japanese Patent Application No. 2005-069473, filed Mar. 11, 2005, No. 2005-175629, filed Jun. 15, 2005, No. 2005-175630, filed Jun. 15, 2005 and No. 2005-175631, filed Jun. 15, 2005, the contents of which are incorporated herein by reference.

BACKGROUND ART

In recent years, there have been great improvements in DVD (Digital Versatile Disc), its use has spread widely and is now produced on a mass production scale. An example of a production method of DVD in wide use today, very briefly, includes the steps of: setting a stamper, which has a slit for forming information signals, to a mold for injection molding; forming a disc substrate of 0.6 mm thickness by the injection molding; forming a layer or film of a reflecting layer on a surface on which the slit exists; and, after that, adhering or sticking two disc substrates together by using a light-colored or clear (hereinafter, clear) adhesive. By applying this method, a finished product is obtained. With respect to an apparatus applying such a method in which the DVD is produced by adhering two disc substrates, various structures of production lines have already been proposed (for example, see Japanese Patent Application, First Publication No. 2002-245692).

On the other hand, a disc which is applicable to high-density recording as an information recording medium which can be applied to a next generation high-recording density has been developed. With respect to this disc, applicable to high-density recording, upon recording and reading/playing back, a laser with a short wavelength such as 405 nm is applied from the opposite side of the disc; therefore, it is required to form a light transmission layer which is a thin layer with a 100-μm (0.1-mm) thickness and which is clear on the reflecting layer. Moreover, in a case of a disc which is applicable to high-density recording on two signal layers, it is required to form: another light transmission layer having a second signal layer; a semitransparent reflecting layer; and a clear covering layer, wherein the thickness should be approximately 100 μm including the light transmission layer and the covering layer. Uniformity of thickness of the light transmission layer and the covering layer has great effects upon recording and reading information; therefore, a high level of uniformity is required.

Therefore, a method and an apparatus for forming a light transmission layer with high uniformity, by supplying a radiation-hardening liquid material at a position as close to a center portion of the disc substrate as possible and by conducting spin-coating, are already disclosed (for example, see Japanese Patent No. 3557863 and Japanese Patent Application, First Publication No. 2004-220750). Moreover, if an air bubble is included between the light transmission layer which is clear and inside and the covering layer, there are great effects upon recording and reading the information; therefore, a method and an apparatus, in which a disc substrate with a first signal layer and a printing/transferring disc substrate with a second signal layer are adhered, is already disclosed (for example, see Japanese Patent No. 3302630). A method and an apparatus for reliably and easily peeling, detaching or removing the printing/transferring disc substrate is already disclosed as well (for example, see Japanese Patent Application, First Publication No. 2002-197731).

DISCLOSURE OF THE INVENTION

A first invention provides an optical disc production apparatus which produces an optical disc that has one or two signal layers, characterized by including: a first signal layer forming mechanism which forms a first signal layer on a disc substrate; a layer forming mechanism which selectively forms a first reflection layer on the first signal layer on the disc substrate or a second reflection layer on a second signal layer that is formed on the first reflection layer; a second signal layer forming mechanism which forms the second signal layer on the disc substrate on which the first reflection layer is formed on the first signal layer; a light transmission layer forming mechanism which forms a light transmission layer on the first reflection layer or on the second reflection layer; a first transportation mechanism in a looped shape which is provided close to the first signal layer forming mechanism, the layer forming mechanism, the second signal layer forming mechanism and the light transmission layer forming mechanism, and which transports the disc substrate; a second transportation mechanism provided close to the first transport mechanism that transports the disc substrate on which the first reflection layer is formed on the first signal layer or the disc substrate on which the second reflection layer is formed to the light transmission layer forming mechanism; a first transfer mechanism which transfers the disc substrate on which the first signal layer is formed to the first transportation mechanism; a second transfer mechanism that selectively transfers the disc substrate transferred by the first transportation mechanism on which the first reflection layer is formed on the first signal layer or the disc substrate on which the second reflection layer is formed to the second transportation mechanism; and a third transfer mechanism that transfers the disc substrate transferred by the first transportation mechanism on which the first reflection layer is formed on the first signal layer to the second signal layer forming mechanism, and that transfers the disc substrate on which the second signal layer is formed by the second signal layer forming mechanism to the first transportation mechanism.

A second invention in accordance with the above-described invention provides an optical disc production apparatus, wherein when the optical disc with one signal layer is produced: the second signal layer forming mechanism is stopped; the layer forming mechanism forms only the first reflection layer on the disc substrate; the second transfer mechanism transfers the disc substrate on which the first reflection layer is formed to the second transportation mechanism; and the light transmission layer forming mechanism forms the light transmission layer which is a cover layer on the first reflection layer of the disc substrate.

A third invention in accordance with the above-described inventions provides an optical disc production apparatus, wherein when the optical disc with two signal layers is produced, in a portion of an interval of the first transportation mechanism, both the disc substrate on which the first signal layer is formed and the disc substrate on which the second signal layer is further formed are transported alternatively.

A fourth invention in accordance with the above-described inventions provides an optical disc production apparatus, wherein the light transmission layer forming mechanism further comprises: a rotation operation apparatus which extends liquid material for forming the light transmission layer on the first reflection layer or the second reflection layer; a first hardening light radiation apparatus for semi-hardening or hardening the light transmission layer in a liquid state except for an outside edge portion; and a second hardening light radiation apparatus for hardening the overall light transmission layer.

A fifth invention in accordance with the above-described inventions provides an optical disc production apparatus, wherein: the second transportation structure is constituted from both a first transportation line and a second transportation line which independently conduct transportation operations; the light transmission layer forming mechanism is provided at the first transportation line; the second transportation line includes a mechanism for forming, and coat layer on the light transmission layer which is the cover layer; the first transport line includes both a fourth transfer mechanism and a disc mounting portion at an end portion of the first transport line; and the fourth transfer mechanism transfers the disc substrate on the first transportation line on which the light transmission layer that is the cover layer is formed to the second transportation line while normally conducting operations, transfers and mounts the disc substrate on which the light transmission layer is formed from the first transportation line to the disc mounting portion when a problem occurs, and transfers the disc substrate from the disc mounting portion to the second transportation line when the problem is resolved.

In accordance with the first-third inventions, it is possible to produce both an optical disc including one signal layer which is applicable to high-density recording with high quality, and an optical disc including two signal layers which is applicable to high-density recording with high quality, selectively or in accordance with the user's designation by using one apparatus, and moreover, it is possible to provide a production apparatus which is economically advantageous.

Especially, in accordance with the fourth invention, it is possible to produce an optical disc with an excellently flat light transmission layer, which is applicable for high-density recording.

In accordance with the fifth invention, the overall apparatus is not stopped, therefore, it is possible to produce economically advantageous optical discs always with uniform quality.

A sixth invention provides an optical disc production apparatus for producing a disc substrate with one or two signal layers including: a liquid material supplying mechanism which supplies liquid material to a disc substrate; a first rotation operation apparatus which extends the liquid material supplied to the disc substrate by applying centrifugal force in order to form a light transmission layer; a second rotation operation apparatus which rotates the disc substrate on which the light transmission layer is formed at a rotation speed which is smaller than a rotation speed of the first rotation operation apparatus; a first hardening light radiation apparatus which radiates hardening light on the disc substrate mounted on the second rotation operation apparatus; a mask portion in a ring shape which is made from a light blocking material that substantially blocks the hardening light, and has both an inner diameter that is larger than 90% of an outside diameter of the disc substrate and an outside diameter that is larger than the outside diameter of the disc substrate; a mask transfer mechanism which transfers the mask portion to a predetermined position which is close to a front surface of the disc substrate when the hardening light is radiated from the first hardening light radiation apparatus in order to prevent the hardening light from substantially radiating on an outside edge portion that is larger than 90% of the light transmission layer extended on the disc substrate, and transfers from the predetermined position to another position after finishing radiating the hardening light; and a second hardening light radiation apparatus for hardening an overall surface of the light transmission layer extended on the disc substrate.

A seventh invention in accordance with the above-described invention provides an optical disc production apparatus, wherein: the mask transfer mechanism comprises: a mask supporting portion which supports the mask portion; a base portion which is fixed to a fixed structural object; a vertically movable portion which is fixed to the base portion and which is vertically movable against the base portion and moves up and down the mask supporting portion; a gyrate drive portion which rotates the mask supporting portion.

An eighth invention in accordance with the above-described inventions provides an optical disc production apparatus, further including around the liquid material supplying mechanism: a cap mounting table on which a plurality of cap members that cover a center aperture of the disc substrate are mounted; and a cap transfer apparatus which transfers the cap member mounted on the cap mounting table and covers the center aperture of the disc substrate mounted on the first rotation apparatus with the cap member, wherein: the liquid material supplying mechanism supplies the liquid material at a center or close to the center of the cap member which covers the center aperture of the disc substrate; and the cap transfer apparatus, with respect to each of the disc substrate or a plurality of the disc substrates, replaces the cap member which is mounted on the center aperture of the disc substrate with another cap member which is newly mounted on the cap mounting table.

A ninth invention in accordance with the above-described inventions provides an optical disc production apparatus, wherein: a pair of the second rotation operation apparatuses are arranged at positions at the same distance from the first hardening light radiation apparatus which is one apparatus; and the first hardening light radiation apparatus radiates the hardening light on each of the disc substrates mounted on the pair of the second rotation operation apparatuses alternatively.

A tenth invention in accordance with the above-described inventions provides an optical disc production apparatus, wherein: the second hardening light radiation apparatus is arranged above a transportation line which transports the disc substrate on which the light transmission layer is formed; and a shutter portion for preventing the transportation line from being radiated by the hardening light from the second hardening light radiation apparatus is further disposed.

In accordance with the sixth invention, it is possible to provide a production apparatus of the optical disc which can produce high quality optical discs including the light transmission layer with uniform coating thickness without a thick portion at an outside edge portion, peripheral portion or outside surrounding portion.

Especially, in accordance with the seventh invention, there is no disruption in air flow caused by movement of the masking portion while the second rotation operation apparatus is rotating; therefore, it is possible to provide an optical disc production apparatus which can produce high quality optical discs with further uniform coating thickness.

In accordance with the eighth invention, it is possible to obtain the light transmission layer with further uniformity; therefore, it is possible to provide the optical disc production apparatus which can produce optical discs with higher quality. Moreover, it is possible to supply the liquid material because the cap member is exchanged or replaced, therefore, it is possible to obtain the light transmission layer with further uniformity.

In accordance with the ninth invention, it is possible to prevent rising temperature of the apparatus overall; therefore, it is possible to stably produce the optical discs with high quality.

In accordance with the tenth invention, it is possible to provide the optical disc production apparatus which can operate a light irradiation step without causing undesirable influences on other portions such as a transportation line or the like because of generating heat.

An eleventh invention provides an optical disc production apparatus for producing a disc substrate with one or two signal layers including: a first liquid material supplying apparatus which supplies a first liquid material onto a first reflection layer which is formed on a first signal layer of a disc substrate; a first rotation operation apparatus which rotates the disc substrate at a high speed and extends the first liquid material on the first reflection layer of the disc substrate by applying centrifugal force in order to form a transparent first light transmission layer; a second liquid material supplying apparatus which supplies a second liquid material onto a second signal layer of a printing/transferring disc substrate; a second rotation operation apparatus which rotates the printing/transferring disc substrate at a high speed and extends the second liquid material on the second signal layer of the printing/transferring disc substrate by applying centrifugal force in order to form a transparent light-transmissive printing/transferring layer; a mask portion in a ring shape which is made from a light blocking material that substantially does not transmit the hardening light and that covers an area which is substantially the same as an outside edge portion of the disc substrate or the printing/transferring disc substrate; a first hardening light radiation apparatus which radiates hardening light on the disc substrate or the printing/transferring disc substrate, which radiates the hardening light through an inner diameter blank portion of the mask portion, and which semi-hardens or hardens an area of the first light transmission layer or the light-transmissive printing/transferring layer positioned at the inner diameter blank portion; a combining mechanism which arranges both the first light transmission layer formed on the disc substrate and the light-transmissive printing/transferring layer formed on the printing/transferring disc substrate facing each other in order to combine and adhere; a second hardening light radiation apparatus which radiates hardening light overall on both the first light transmission layer and the light-transmissive printing/transferring layer from one side or both sides of the disc substrate and the printing/transferring disc substrate which are combined; and a peeling apparatus which peels the printing/transferring disc substrate in order to print the second signal layer on the disc substrate.

A twelfth invention in accordance with the above-described invention provides an optical disc production apparatus, further including a turntable mechanism which comprises a plurality of mounting portions that mount the disc substrate and the printing/transferring disc substrate alternatively, wherein: the mounting portion is made from a material which transmits the hardening light; the mask portion is provided at the mounting portion; and the mask portion supports an outside edge portion of the disc substrate or the printing/transferring disc substrate.

A thirteenth invention in accordance with the above-described inventions provides an optical disc production apparatus, wherein the mask portion in a ring shape that has both an inner diameter which is larger than 90% of an outside diameter of the disc substrate or the printing/transferring disc substrate and an outside diameter which is larger than the outside diameter of the disc substrate or the printing/transferring disc substrate.

A fourteenth invention in accordance with the above-described inventions provides an optical disc production apparatus, wherein the combining mechanism provides a maintaining mechanism which maintains both the first light transmission layer of the disc substrate and the light-transmissive printing/transferring layer of the printing/transferring disc substrate facing each other along with keeping a predetermined distance, and overlaps both the first light transmission layer of the disc substrate and the light-transmissive printing/transferring layer of the printing/transferring disc substrate.

A fifteenth invention in accordance with the above-described inventions provides an optical disc production apparatus, wherein the hardening light which is radiated from the first hardening light radiation apparatus transmits through the disc substrate or the printing/transferring disc substrate, and semi-hardens or hardens the first light transmission layer or the light-transmissive printing/transferring layer.

In accordance with the eleventh invention, it is possible to effectively form the light transmission layer for transferring with uniform thickness and to provide the optical disc production apparatus which can produce high quality optical discs applicable for recording and reading with high quality.

In accordance with the twelfth and thirteenth inventions, the masking portion is provided at a mounting portion which has a turntable mechanism; therefore, it is possible to make a structure simple and it is possible to produce high quality optical discs by providing a cost-effective production apparatus.

In accordance with the fourteenth and, fifteenth inventions, it is possible to form the flat light transmission layer without a thick portion at the outside edge portion; therefore, it is possible to provide the apparatus which can produce higher quality optical discs.

BEST MODE FOR CARRYING OUT THE INVENTION

Hereinafter, referring to figures, the best mode for carrying out the invention is explained. It should be noted that the present invention is not limited by each embodiment below and, for example, it is possible to combine each constitutional element of these embodiments appropriately.

First Embodiment

Figure 1:
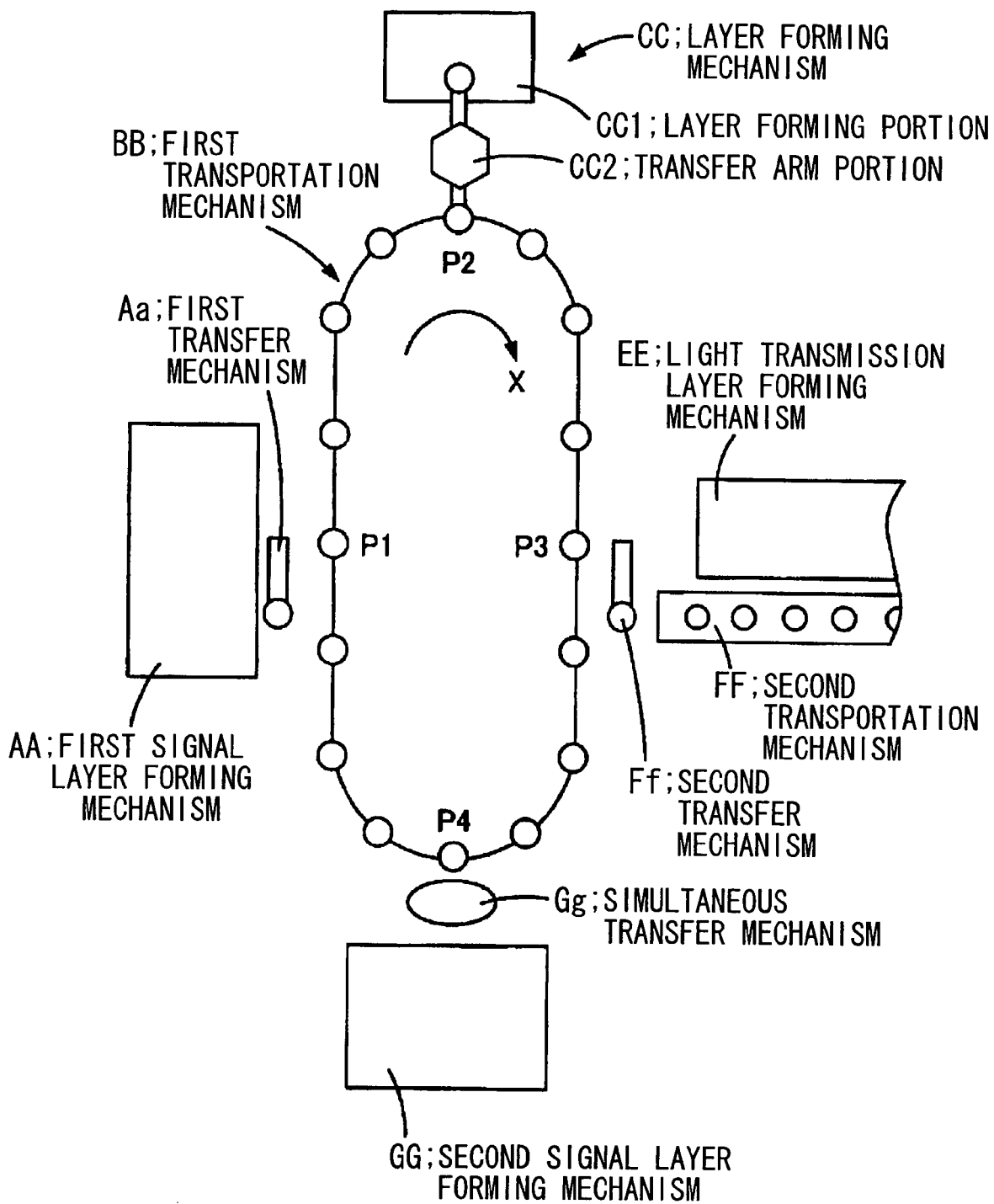
FIG. 1 is a figure showing an outline constitution of an overall optical disc production apparatus of the best mode embodiment of the present invention.

First, an optical disc production apparatus 200 of the first embodiment which is the basis for implementing the present invention is explained in reference to FIGS. 1, 2A-D, 2E and 2F. FIG. 1 shows a basic constitution of the optical disc producing apparatus 200, and FIG. 2A-D, FIGS. 2E and 2F are figures explaining optical disc producing steps.

This optical disc producing apparatus 200 is roughly constituted from: a first signal layer forming mechanism AA which produces a disc substrate D1 on which a first signal layer is formed on one side; a first transportation mechanism BB which intermittently transports to a direction of an arrow X, that is, a clockwise direction; a first transfer mechanism Aa which transfers the disc substrate from the first signal layer forming mechanism AA to the first transportation mechanism BB; a layer forming mechanism CC which forms two kinds of reflection layers; a light transmission layer forming mechanism EE which forms a light transmission layer that is a cover layer; a second transportation mechanism FF; a second transfer mechanism Ff which selectively transfers the disc substrate from the first transportation mechanism BB to the second transportation mechanism FF; a second signal layer forming mechanism GG which forms a second signal layer on the disc substrate on which the first signal layer is already formed; and a simultaneous transfer mechanism Gg which transfers the disc substrate between the first transportation mechanism BB and the second signal layer forming mechanism GG. Detailed examples of these mechanisms are explained in a second embodiment.

Figure 2A:
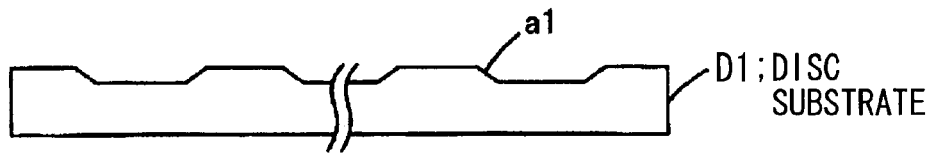
FIG. 2A is a figure showing production steps of producing optical discs applicable to high-density recording by using an optical disc production apparatus 200 of the present invention.

The first signal layer forming mechanism AA is constituted from: a generally-used injection molding apparatus which conducts an injection molding of the disc substrate D1 that has the first signal layer on one side as shown in FIG. 2A; and a cooling mechanism which cools down the disc substrate D1 to room temperature. The first transfer mechanism Aa transfers the disc substrate D1 on which the first signal layer is formed to the first transportation mechanism BB at a position P1. It is possible to apply a generally used mechanism to the first signal layer forming mechanism AA. The first transportation mechanism BB has multiple positions designated by circles, and at the position P1, a disc D3 formed by the later-described second signal layer forming mechanism GG is already transferred on every second circle; therefore, at the position P1, the disc substrates D1 are also transferred on every second circle. In other words, among a portion of an interval of the first transportation mechanism BB, the disc substrates D1 and the discs D3 are transported one after the other; therefore, the disc substrates D1 and the discs D3 are supplied to the layer forming mechanism CC alternately. It is possible to apply a generally used mechanism to the first transportation mechanism BB.

Figure 2B:
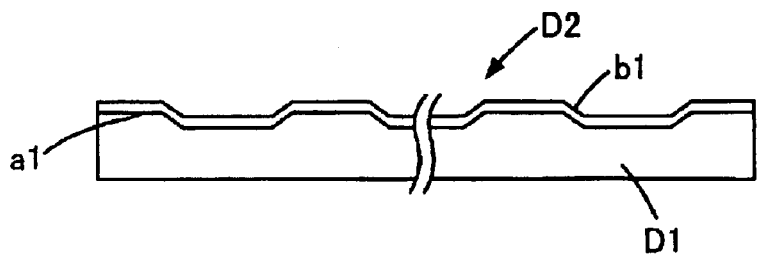
FIG. 2B is a figure showing production steps of producing optical discs applicable to high-density recording by using the optical disc production apparatus 200 of the present invention.

The layer forming mechanism CC is constituted from: a layer forming portion CC1 which can selectively or alternatively form two kinds of reflection layers that are a reflection layer of total reflection and a semitransparent reflection layer; and a transfer arm portion CC2. When the disc substrate D1 is transferred from a position P2 by a transfer arm portion CC2, as shown in FIG. 2B, the layer forming portion CC1 forms a first reflection layer b1 of total reflection on a first signal layer a1, and the transfer arm portion CC2 returns it to the transfer position P2. A disc on which the first reflection layer b1 of total reflection is formed on the first signal layer a1 is called a disc D2. It is possible to constitute the layer forming mechanism CC from two layer forming mechanisms which form the two kinds of reflection layers respectively or independently. In a case in which an optical disc including two signal layers is produced, without being transferred to the light transmission layer forming mechanism EE at a position P3 of the first transportation mechanism BB, the disc D2 is transported and passes through the position P3 and is taken into the second signal layer forming mechanism GG by the simultaneous transfer mechanism Gg.

Figure 2C:
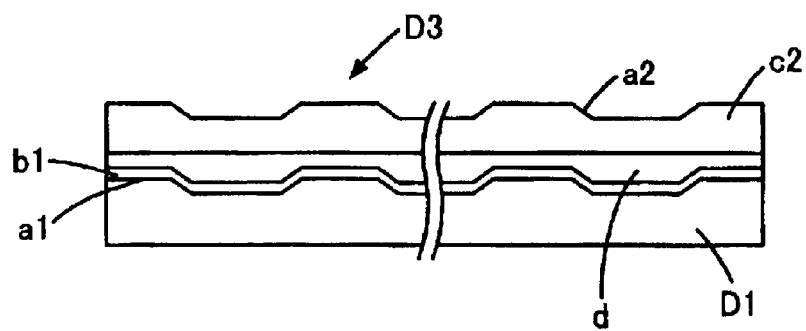
FIG. 2C is a figure showing production steps of producing optical discs applicable to high-density recording by using the optical disc production apparatus 200 of the present invention.

With respect to the second signal layer forming mechanism GG, details of its constitution are not shown in figures. The second signal layer forming mechanism GG has a structure such as including: an adhering layer forming portion which forms an adhering layer on the reflection layer b1 of the disc D1; an injection molding apparatus which conducts injection molding of a printing/transferring disc substrate which includes a second signal layer for transferring; a light-transmissive printing/transferring layer forming portion which forms a light transmission layer for transferring on the second signal layer; an adhering portion which adheres both the printing/transferring disc on which the light transmission layer is formed and the disc D2; a removing portion which removes the printing/transferring disc substrate from the light transmission layer and transfers the second signal layer; and the like, or, has a generally known structure which forms the second signal layer made from organic coloring materials, inorganic materials or the like, on the first reflection layer b1. There is no particular reason in which this second signal layer forming mechanism GG is a limitation of the constitution. In this embodiment, a concrete example of forming the second signal layer in accordance with a transfer printing or a transferring method is explained. FIG. 2C shows a disc D3 which is formed by adhering the first reflection layer b1 of the disc D2 and the light transmission layer for transferring of the printing/transferring disc and by detaching, peeling or removing the printing/transferring disc substrate from the light transmission layer, and the light transmission-layer is transferred on the disc D3. The disc D3 is a disc on which an adhering layer d is formed on the first reflection layer b1 of the disc D2, a light transmission layer c2 is adhered to the adhering layer d, and the second signal layer a2 is transferred on an upper surface of the light transmission layer c2.

The second signal layer a2 is transferred or printed on the disc D3 and the disc D3 is transferred to the first transportation mechanism BB at a position P4 by the simultaneous transfer mechanism Gg. At this time, the discs. D3 are transferred at alternate positions in order to transfer the disc substrates D1 with a certain gap or span at the position P1 as described above. Therefore, among the positions P1-P3 of the first transportation mechanism BB, the disc substrates D1 and discs D3 are mounted and transferred alternately. The disc substrates D1 and the discs D3 are taken into the layer forming mechanism CC one by one and one after another. The first reflection layer b1 of total reflection is formed on the disc substrate D1 and the semitransparent second reflection layer b2 is formed on the disc D3.

Figure 2D:
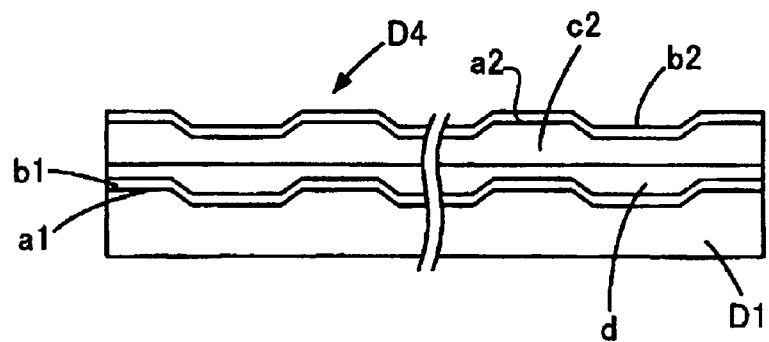
FIG. 2D is a figure showing production steps of producing optical discs applicable to high-density recording by using the optical disc production apparatus 200 of the present invention.
Figure 2E:
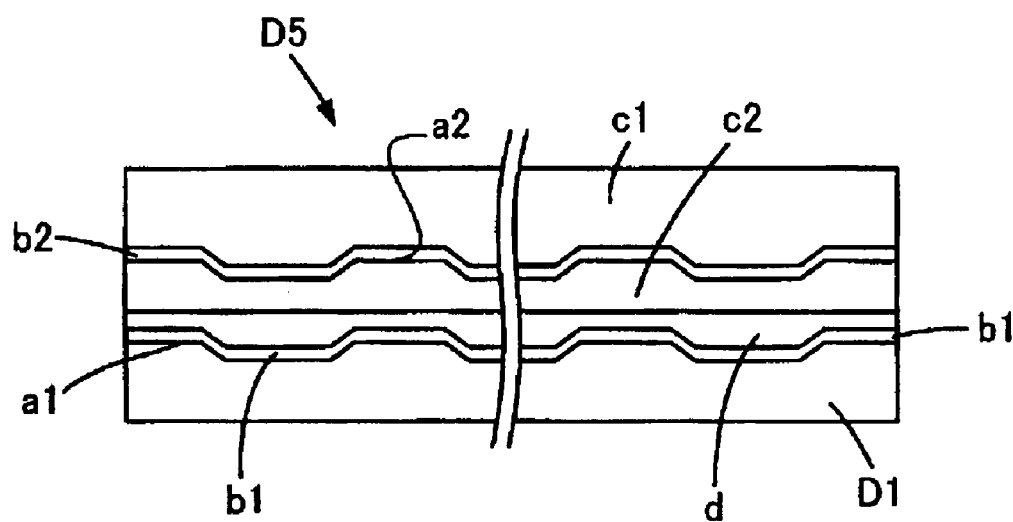
FIG. 2E is a figure showing production steps of producing optical discs applicable to high-density recording by using the optical disc production apparatus 200 of the present invention.

The disc D2 on which the first reflection layer b1 is formed and the disc D4 on which the semitransparent second reflection layer b2 as shown in FIG. 2D is formed are transferred to the first transportation mechanism BB. Only the disc D4 is transferred to the light transmission layer forming mechanism EE by the second transfer mechanism Ff. As described above, the disc D2 is transported by the first transportation mechanism BB along with keeping it as it is and is transferred to the second signal layer forming mechanism GG at the position P4 by the transfer mechanism Gg. Therefore, between the positions P2-P3 of the first transportation mechanism BB, the discs D2 and the discs D4 are transported alternately. As shown in FIG. 2E, with respect to the disc D4 which is transferred to the light transmission layer formation mechanism EE, the light transmission layer c1 is formed as a covering layer on the semitransparent second reflection layer b2. After forming the light transmission layer c1, the disc is called disc D5.

Figure 2F:
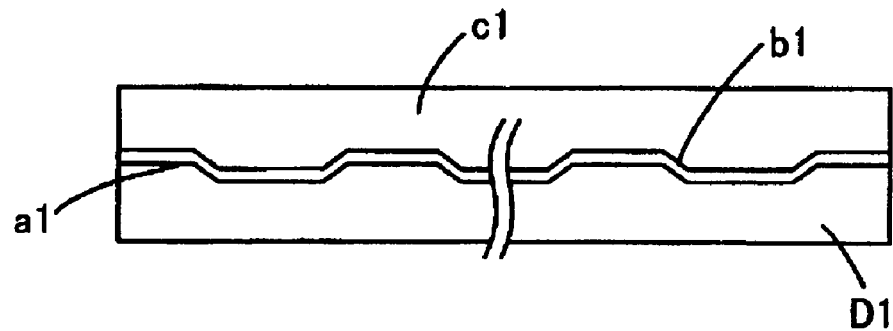
FIG. 2F is a figure showing production steps of producing optical discs applicable to high-density recording by using the optical disc production apparatus 200 of the present invention.

Hereinbefore, a case of producing an optical disc including two signal layers is explained. In a case in which an optical disc including one signal layer is produced, all the discs D2 on which the first signal layer a1 and the first reflection layer b1 are formed are transferred to the second transportation mechanism FF by the second transfer mechanism Ff, and as shown in FIG. 2F, the light transmission layer c1 is formed on the first reflection layer b1 as the covering layer by the light transmission layer forming mechanism EE. This light transmission layer c1 has a thickness almost the same as a total thickness of the light transmission layers c1 and c2 of the optical disc including two signal layers, and the thickness is approximately 100 μm. From the above explanation, it is clear that the present invention can provide the optical disc production apparatus that can selectively produce the optical discs which include one or two signal layers and which are applicable to high-density recording even though only one apparatus is used, and therefore, the apparatus is economically advantageous.

Second Embodiment

Figure 3:
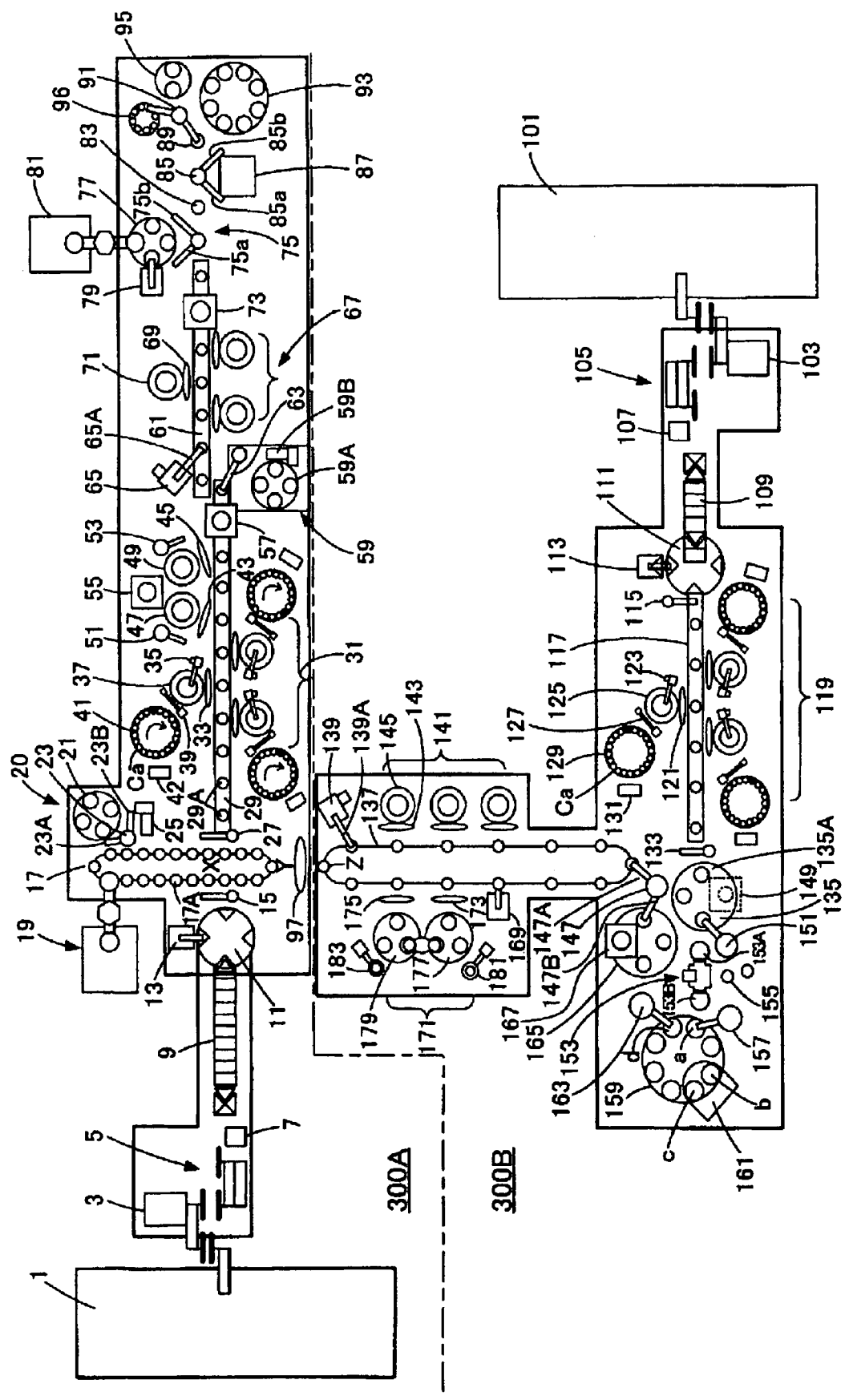
FIG. 3 is a figure showing an overall constitution of the optical disc production apparatus 300 of the best mode of the present invention.
Figure 4A:
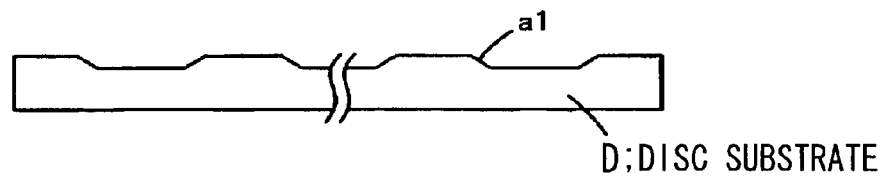
FIG. 4A is a figure showing production steps of producing optical discs including one signal layer applicable to high-density recording by using an optical disc production apparatus 300 of the present invention.
Figure 4B:
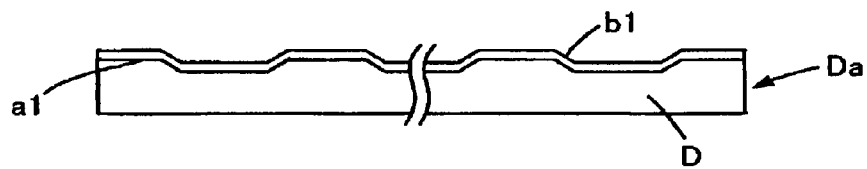
FIG. 4B is a figure showing production steps of producing optical discs including one signal layer applicable to high-density recording by using the optical disc production apparatus 300 of the present invention.
Figure 4C:
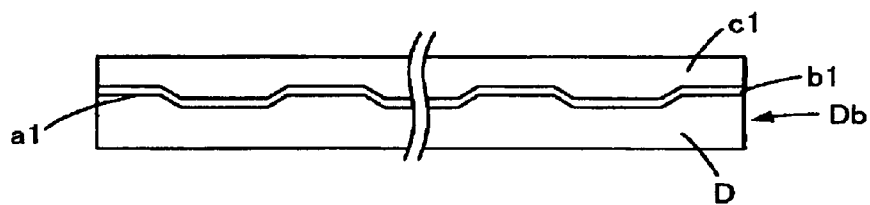
FIG. 4C is a figure showing production steps of producing optical discs including one signal layer applicable to high-density recording by using the optical disc production apparatus 300 of the present invention.
Figure 4D:
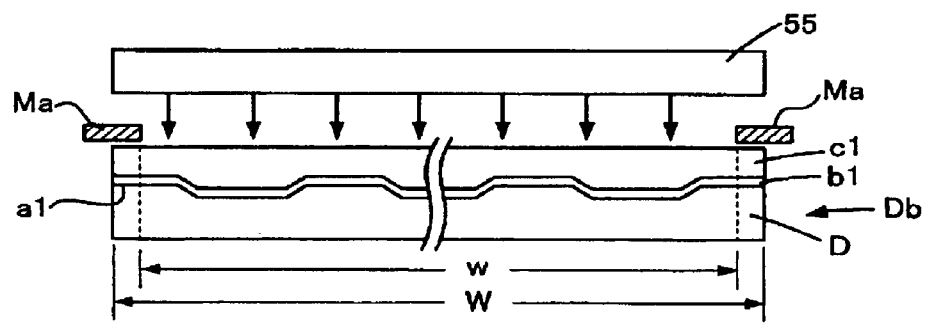
FIG. 4D is a figure showing production steps of producing optical discs including one signal layer applicable to high-density recording by using the optical disc production apparatus 300 of the present invention.
Figure 4E:
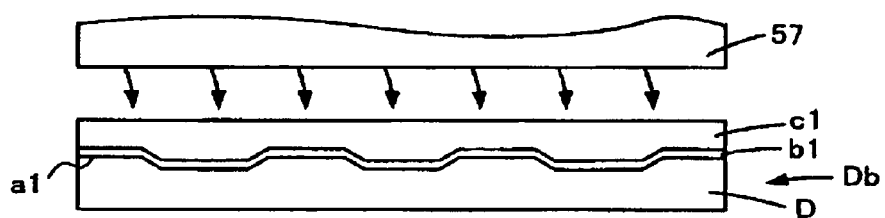
FIG. 4E is a figure showing production steps of producing optical discs including one signal layer applicable to high-density recording by using the optical disc production apparatus 300 of the present invention.
Figure 4F:
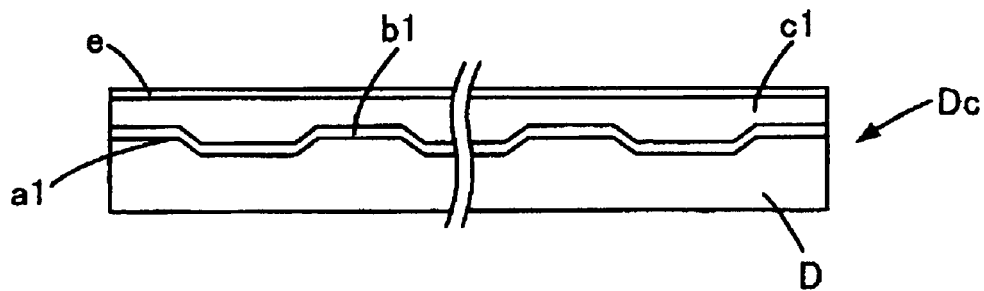
FIG. 4F is a figure showing production steps of producing optical discs including one signal layer applicable to high-density recording by using the optical disc production apparatus 300 of the present invention.
Figure 4G:
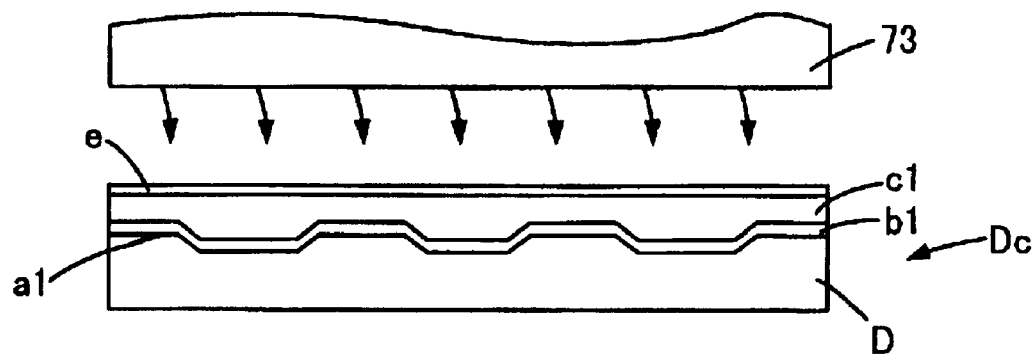
FIG. 4G is a figure showing production steps of producing optical discs including one signal layer applicable to high-density recording by using the optical disc production apparatus 300 of the present invention.
Figure 4H:
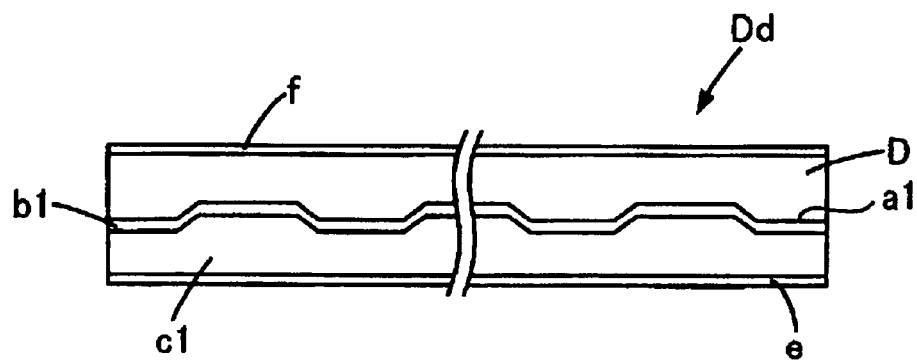
FIG. 4H is a figure showing production steps of producing optical discs including one signal layer applicable to high-density recording by using the optical disc production apparatus 300 of the present invention.
Figure 5:
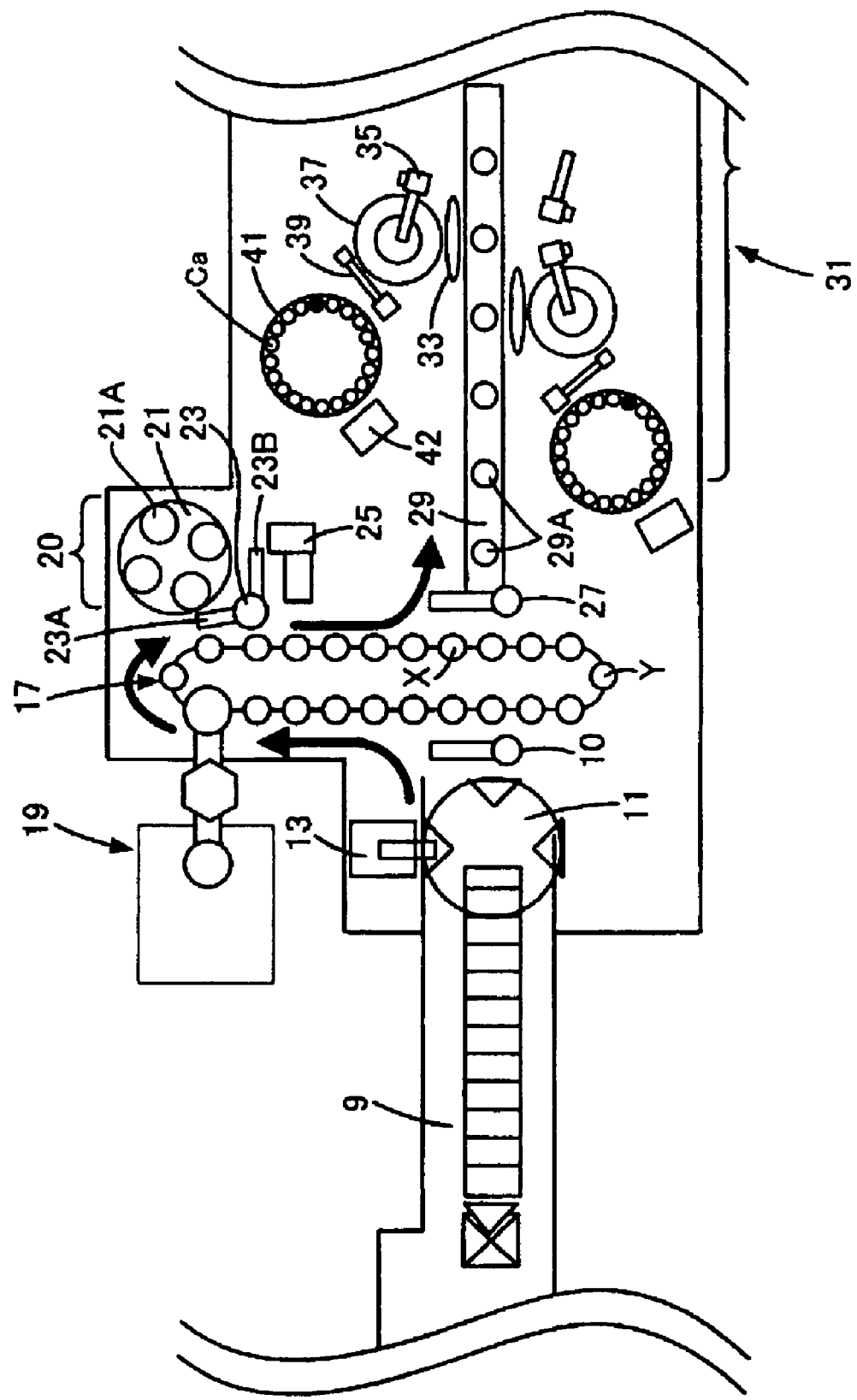
FIG. 5 is a figure showing a portion of the optical disc production apparatus 300 of the present invention.

Referring to FIG. 3-5, an optical disc production apparatus 300 of the second embodiment that is a best mode for implementing the present invention is explained. FIG. 3 shows the overall optical disc production apparatus 300, FIG. 4A-E and FIG. 4F-H are figures for explaining production steps of the optical disc, and FIG. 5 is a figure showing a portion of the optical disc production apparatus 300.

This optical disc production apparatus 300 is constituted from two portions including a mechanism portion 300A and a mechanism portion 300B which are divided by a long-dashed-short-dashed line. When the optical disc including one signal layer is produced, only the mechanism portion 300A is operated and the mechanism portion 300B is not operated. There is a significant feature of the present invention in which both the mechanism portion 300A and the mechanism portion 300B are operated when the optical disc including two signal layers is produced. First, along with showing an example of the optical disc including one signal layer, the mechanism portion 300A is explained with respect to a case of producing the optical disc which includes one signal layer and which is applicable to high-density recording.

An injection molding apparatus 1 of FIG. 3, to which a stamper which includes a metal mold with a desired recording groove for injection molding is attached, molds the disc substrate D including a signal layer a1 shown in FIG. 4A by applying injection molding. The disc substrate D is made from a polycarbonate resin disc which has 1.1 mm thickness, 120 mm diameter and a center hole of 15 mm diameter. On the signal layer a1, information signals are formed as pits that are in an uneven state with grooves or slits, and for easy explanation, the pits in the uneven state are, comparing to the thickness of the disc substrate D, greatly magnified and shown. However, the method of forming the signal layer a1 on the disc substrate is not limited to this. The disc substrate D is transferred to a cooling mechanism 5 which is set close to the injection molding mechanism 1 by a disc substrate takeout mechanism 3, and is cooled down by rotating or spinning. An external form and size of the disc substrate D are not limited to this.

With respect to the cooling mechanism 5, the applicant of the present application has already submitted a proposal (for example, Japanese Patent Application, First Publication No. 2002-358695), therefore, its details are not shown in figures. The disc substrate D is taken out of the injection molding apparatus 1 perpendicularly against the vertical direction or horizontally; therefore, the disc cooling mechanism 5 cools down the disc substrate D by rotating or spinning while the cooling mechanism 5 is holding or maintaining the disc substrate D perpendicularly. Just after taking out of the injection molding apparatus 1, the disc substrate D is soft or not solidified yet. The cooling mechanism 5 rotates or spins at a high speed such as a few thousand rpm or more preferably, faster than 3000 rpm; therefore, it is possible to obtain the disc substrate D with less or very small warping by cooling down at a high speed along with providing high centrifugal force on the disc substrate D. The cooling mechanism 5 has three rotation cooling apparatuses, which are not shown in figures, in consideration of both performance/ability of the injection molding apparatus 1 and its practically effective cooling time, and three rotation cooling apparatuses are set in a same distance from the disc substrate takeout mechanism 3. The disc substrate D which is taken out of the injection molding apparatus 1 is transferred by the disc substrate take-out mechanism 3 to three rotation cooling apparatuses one by one.

After rotating for a predetermined time, each of the rotation cooling apparatuses stops rotating and, the transfer mechanism 7, along with keeping the disc substrate D in a vertical state, transfers from the rotation cooling apparatus to an aging mechanism 9 one by one. The aging mechanism 9 has a general constitution and cools down the disc substrate approximately to room temperature by moving forward in a air-conditioned room at a fixed speed along with keeping the disc substrates D in a vertical state. At the end of the aging mechanism 9, the disc substrate D is passed to an intermittent rotation mechanism 11 in a horizontal state one by one and is transported to an obverse and reverse turning mechanism 13 at a next position along with rotation of the intermittent rotation mechanism 11. The obverse and reverse turning mechanism 13 turns in order to set the signal layer a1 formed on the disc substrate D upside or underside, and the obverse and reverse turning mechanism 13, when it supplies to a layer forming apparatus 19, conducts selectively in accordance with cases in which the surface of the signal layer a1 formed on the disc substrate D taken out of the injection molding apparatus 1 is set upside or underside. In this example, the obverse and reverse turning mechanism 13 turns 180-degrees in order to set the signal layer a1 upside. The mechanism above shows a concrete example of the first signal layer forming mechanism shown in FIG. 1. Along with rotation of the intermittent rotation mechanism 11, the disc substrate D is transferred to a transportation line 17 by the first transfer mechanism 15 which is arranged at a next position.

The first transportation line 17 of the first transportation mechanism has an endless and, preferably, longitudinally long shape on the figure and has multiple disc mounting portions 17A which are shown with circles, and with respect to the disc substrate D which is transferred to the disc mounting portion 17A, as shown in FIG. 4B, along with intermittent operation of the first transportation line 17, the reflection layer b1 is formed on the signal layer a1 by the layer forming apparatus 19, which is similar to a sputtering apparatus. The reflection layer b1 is a generally used thin coating or film which is made from aluminum, silver, and/or the like and has a thickness that is equal to or smaller than 1 μm. The disc on which the reflection layer b1 is formed is called the disc Da.

It is described later, however, in a third embodiment, that the layer forming apparatus 19 forms a second semitransparent reflection layer when the disc Da is transported again after adhering a light-transmissive printing/transferring layer and/or the like by operating various steps.

A disc saving portion 20 is provided along the transportation line 17, and the disc saving portion 20 is constituted from a disc mounting rotation table 21, a transferring mechanism 23 and a spacer saving mechanism 25. These mechanisms are not used while the apparatus is working normally; however, when the following mechanisms are stopped because of a problem and/or the like, the disc Da is saved on the disc mounting rotation table 21 by operating in a manner described below.

As shown in FIG. 5, the disc mounting rotation table 21 has mounting portions 21A and is similar to a stacking pole and mounts multiple, for example, 200 discs Da at four points, and a spacer saving portion 25 has multiple spacers not shown in figures and is used for obtaining spaces or gaps between the discs Da upon mounting the discs Da. The transferring mechanism 23, by using one transferring arm 23A, mounts the discs Da obtained from the transportation line 17 on the disc mounting rotation table 21 one by one, and, by using another transferring arm 23B, receives a spacer which is not shown in figures from the spacer saving portion 25 and places it on the disc Da respectively. As well, the transferring mechanism 23 has a function in which, when the problem is resolved, after receiving a problem resolution signal, before the disc Da is transported on the transportation line 17, the disc Da is automatically transferred from the disc mounting rotation table 21 to the transportation line 17 automatically by using the transfer arm 23A. Therefore, it is possible to use the disc Da efficiently without wasting it.

Next, as shown with solid line arrows in FIG. 5, by a transfer mechanism 27, the disc Da is transferred from a first transfer position X of the transportation line 17 to a transportation line 29 which is a first transportation line of a second transportation mechanism, and the discs Da are intermittently transported by the transportation line 29 one by one. Although not concretely shown, however, the transportation line 29 has mounting tables 29A which are arranged with a certain interval or gap and are made from metal, resin or the like, and the discs Da are mounted on such mounting table one by one. In order to effectively harden or solidify liquid materials on a surface of an outside edge of the disc and to avoid adhesion of the liquid materials on the mounting table, it is preferable that a diameter of the mounting table 29A be smaller than a diameter of the disc and is approximately a size for mounting a surrounding portion of a center aperture of the disc. Along the transportation line 29, first, a light transmission layer forming portion 31 that forms a light transmission layer which is a cover layer with a thickness of approximately 100 μm, is provided. The light transmission layer forming portion 31 has three sets of mechanisms and each of the sets includes: a liquid supplying mechanism 35 which supplies the liquid material to a simultaneous transfer mechanism 33 and the disc Da; a rotation operation apparatus 37 which spreads, extends and/or flattens the liquid material on the disc Da by conducting a high speed rotation operation; a transfer mechanism 39; a cap saving mechanism 41; and a cap cleaning mechanism 42. These three sets have the same mechanism and operate simultaneously. The number of sets is not limited to three, and it is possible to produce if there is one or more sets. Moreover, the light transmission layer forming portion 31 is not limited to such a constitution.

Each of three simultaneous transfer mechanisms 33 has a pair of transfer arms not shown in figures. When one of the arms obtains or maintains the disc Da on the transportation line 29 by suction, another arm simultaneously obtains or maintains the disc Da on which the rotation operation has been operated inside the rotation operation apparatus 37, and after that, the arms horizontally turn or rotate at 180 degrees. When three discs Da on the transportation line 29 are respectively mounted inside the rotation apparatuses 37, three discs Da inside the rotation operation apparatuses 37 are simultaneously mounted on the transportation line 29. In other words, three simultaneous transfer mechanisms 33 conduct the transfer operation of the disc Da every three times the transportation line 29 conducts transport operation; therefore, it is possible to obtain a time of rotation operation of the rotation operation apparatus 37 three times longer than a case in which only one rotation apparatus 37 is applied.

Although not shown in figures, the cap saving mechanism 41 obtains multiple cap materials Ca on a table rotating intermittently. When the disc Da on the transportation line 29 is transferred to an inside of the rotation operation apparatus 37, the transfer mechanism 39 transfers the cap material Ca from the cap saving mechanism 41 so as to cover a center aperture of the disc Da, which is not shown in figures. The cap material Ca has a special structure so as to cover both the center aperture of the disc Da and a center pin of the rotation operation apparatus 37, which is not shown in figures and which is inserted into the center aperture of the disc Da. In general, the disc substrate D has a center aperture of 15 mm in diameter and the recording area which has an inside diameter of 43-46 mm; therefore, an outside diameter of the cap material Ca is approximately 18-23 mm. However, this is not a limitation.

After the center aperture of the disc Da is covered with the cap material Ca, the liquid supplying mechanism 35 supplies the liquid material to a center point or a surrounding area close to the center point of the cap material Ca. The liquid material is made from a clear material such as an acrylic resin and is made so as to have a viscosity and to form a light transmission layer with an approximately 100-μm thickness by applying a spin-coating method. In a case in which the liquid material is supplied to the center point of the cap material Ca, the liquid material is supplied at one point or on one spot; however, in a case in which the liquid material is supplied to the surrounding area close to the center point of the cap material Ca, the liquid material is supplied in a state of a circle surrounding the center point. When the liquid material is supplied on the cap material Ca, the rotation operation mechanism 37 conducts a rotation operation at a high speed and spreads, extends and/or flattens the liquid material on the disc Da by using centrifugal force. FIG. 4C shows a disc Db which is the disc Da on which the light transmission layer c1 that is a cover layer is formed.

The light transmission layer has an approximately 100-μm thickness; therefore, it is possible that, in a step of forming the light transmission layer c1 at the light transmission layer forming portion 31 described above, operations of supplying the liquid material and spreading, extending and/or flattening the liquid material by using centrifugal force are divided into two or more times. By dividing the operations of supplying the liquid material and spreading, extending and/or flattening the liquid material by using centrifugal force, for example, into two times, it is possible to form the light transmission layer c1 with the 100-μm thickness accurately and in a short time. In a case of conducting the rotation operation twice, the same liquid material which has the same viscosity as well is applied; however, this is not necessarily a limitation and it is possible to apply or coat with the liquid material having a lower viscosity at a first time and the liquid material having a higher viscosity at a second time. When a rotation of the rotation operation apparatus 37 is stopped and spreading, extending and/or flattening of the light transmission layer c1 is finished, the transfer mechanism 39 conducts an operation of returning the cap material Ca from the rotation operation apparatus 37 to the cap saving mechanism 41. The liquid material is coated or adhered on this cap material Ca which is returned; therefore, the returned cap material Ca is washed or cleaned up by the cap washing mechanism 42 at a washing position and the liquid material is removed. In this washing step, various methods such as spraying cleaning fluid/washing liquid on it, soaking/steeping it in the cleaning fluid/washing liquid, or the like are applied, and the liquid material is easily removed because, without radiating light for hardening or solidifying, the liquid material is in a liquid state. Such a step is operated by other two sets of the mechanisms simultaneously, and the disc Da on which the light transmission layer c1 is formed is transferred onto the transportation line 29 independently by these three sets of mechanisms. At this time, the light transmission layer c1 is not hardened or solidified yet. It should be noted that it is not needed to change the cap material Ca with respect to each of the disc substrate, and it is possible to change the cap material Ca every certain number of disc substrates or with respect to a plurality of disc substrates.

As described above, especially with respect to an optical disc which is applicable to high-density recording, a degree of flatness of the light transmission layer c1 has a particular influence on operations or results of writing or reading information signals by using the laser beam. Therefore, it is necessary to have a uniform thickness for the light transmission layer c1. However, it is very difficult to form the light transmission layer c1 with the uniform thickness of approximately 100 μm by applying the spin-coating method, and it is known that the outside edge portion, peripheral portion or outside surrounding portion of the light transmission layer c1 is comparatively thicker than an inside portion. There is an effective solution to this problem such as operating a first hardening step by radiating hardening light as described below.

This first hardening step is characterized in that the thickness of the light-transmission layer c1 is uniform because, by mainly radiating the hardening light on other portion than the outside edge portion of the light-transmission layer c1 of the disc Db, the portion is semi-hardened/semi-cured or hardened/cured and the thickness of the portion is fixed, and by leaving the outside portion of the light transmission layer c1 in a semi-cured state for a while, the outside edge portion becomes thinner because of gravity or both gravity and centrifugal force. As shown in FIG. 3, this hardening light irradiation step is operated by using: simultaneous transfer mechanisms 43 and 45 in which both of them have the same structure; rotation operation apparatuses 47 and 49 in which both of them have the same structure; mask mechanisms 51 and 53 in which both of them have the same structure; and a hardening light radiation mechanism 55 such as a common flash lamp apparatus. The simultaneous transfer mechanisms 43 and 45 are operated simultaneously. The simultaneous transfer mechanisms 43 and 45 transfer the disc substrates Db on the transportation line 29 to the rotation operation apparatuses 47 and 49 by using one of edge portions, and simultaneously, the simultaneous transfer mechanisms 43 and 45 transfer the disc substrates Db on which the hardening light such as ultraviolet rays is irradiated on to the transportation line 29 by using another edge portion. Therefore, the simultaneous transfer mechanisms 43 and 45 conduct the transfer operation alternately or every other time along with synchronizing the intermittent transport operation of the transport line 29, and the rotation operation apparatuses 47 and 49 can have sufficient time required for conducting the intermittent transport operation of the transport line 29 twice.

When the simultaneous transfer mechanisms 43 and 45 transfer the disc Db to the rotation operation apparatuses 47 and 49, the mask mechanisms 51 and 53 horizontally slide a mask member Ma shown in FIG. 4D, and the mask member Ma is stopped at a position that is slightly apart from and upward from an upper surface of the disc substrate D2 which is mounted on the rotation operation apparatuses 47 and 49. The mask member Ma is made from a resin material which does not transmit hardening light such as ultraviolet rays, an inorganic material and/or a metallic material, and has a diameter w which is smaller than an outside diameter W of the disc substrate D. In order to keep as little hardening light as possible from entering into the light transmission layer c1 under the mask member Ma, a gap or interval between the mask member Ma and the disc Db is set to be small, and it is preferable to set the mask member Ma at a predetermined position before starting the rotation operation of the rotation operation apparatuses 47 and 49.

This is because, if the mask member Ma is transferred to the predetermined position when the rotation operation apparatuses 47 and 49 are conducting the rotation operation, an air flow is disturbed and a flatness of the light transmission layer c1 is badly affected. A gap or distance between a lower surface of the mask member Ma and a surface of the light transmission layer c1 is set to be a few millimeters or smaller; however, it is possible to change or adjust this gap by changing a height of the mask member Ma.

On the other hand, the hardening light radiation mechanism 55 which is at a same position from both the rotation operation apparatuses 47 and 49 and which is commonly used, first, moves to a setting position at an upper side from the rotation operation apparatus 47 when the simultaneous transfer mechanisms 43 and 45 transfer the disc substrates Db set on the transport line 29 to the rotation operation mechanisms 47 and 49. Therefore, the rotation operation apparatus 47 starts the rotation operation just after the mask member Ma is set at a predetermined position; however, this rotation operation is aimed to finely control the coating thickness of the light transmission layer c1 and to radiate the hardening light evenly on the light transmission layer c1; therefore, this rotation operation is conducted at a lower rotation speed than a rotation speed of the rotation operation apparatus 37 of the light transmission layer forming portion 31, and at or just after a last step of this rotation operation, hardening light is evenly radiated in a short time period that is, for example, for approximately 200 ms from the hardening light radiation apparatus 55 such as a flash lamp apparatus. Because of this radiation of the hardening light, the light transmission layer c1 except for a portion covered or shaded by the mask member Ma is hardened or semi-hardened. However, the outside edge portion, peripheral portion or outside surrounding portion of the light transmission layer c1 which is covered or shaded by the mask member Ma is still in a soft state without being semi-hardened. It should be noted that this radiation of the hardening light can be conducted while the rotation operation by the rotation operation apparatuses 47 and 49 is conducted.

After finishing radiation by the hardening light such as ultraviolet rays, the hardening light radiation apparatus 55 moves toward the rotation operation apparatus 49 passing through the original position, and just before or at a time when the hardening light radiation apparatus 55 stops at a predetermined position above the rotation operation apparatus 49, the rotation operation apparatus 49 starts the rotation operation, and moreover, just after or at a last step of this rotation operation, hardening light is evenly radiated in a short time period from the hardening light radiation apparatus 55. After that, the hardening light radiation apparatus 55 returns to the original position, and the mask mechanisms 51 and 53 respectively move the mask members Ma to the original positions which are out of the rotation operation apparatuses 47 and 49 and prepare for operations of a next cycle. The disc Db has the outside edge portion of the light transmission layer c1 that is only in a soft state yet is returned onto the transportation line 29, and the overall surface of the light transmission layer c1 is hardened in a following second hardening step. The time from end of the first hardening step to starting of the second hardening step is the same length as the time for flattening the thickness of the soft outside edge portion of the light transmission layer c1 by decreasing the thickness because of gravity, and is adjusted or controlled by changing the transportation time. The radiation time of the hardening light radiation apparatus 55 is much shorter than time for the rotation operation and is, for example, less than a few hundred milliseconds (for example, approximately 200 ms); therefore, it is possible to operate by using only one hardening light radiation apparatus 55 even though there are the rotation operation apparatuses 47 and 49, making it economically effective. Moreover it is possible to prevent a bad influence on the quality of the disc because of heat of the apparatus. It should be noted that if the disc Db is still rotated even after radiation of the hardening light at the rotation apparatuses 47 and 49, the soft outside edge portion of the light transmission layer c1 which is covered or shaded by the mask member Ma is further extended and becomes thinner by receiving centrifugal force; therefore, it is possible to flatten further more by controlling the rotation time and to obtain a high quality optical disc. A concrete example of the mask member Ma is described in a fourth embodiment.

As shown in FIG. 4E, in the second hardening step, the hardening light is radiated from upside of the disc Db; therefore, the hardening light radiation apparatus 57 such as a flash lamp apparatus is provided above a hardening position on the transportation line 29. The hardening light radiation apparatus 57 can move, slide or shift up and down synchronously with an intermittent transportation operation of the transportation line 29, and when the transportation line 29 intermittently stops, the hardening light radiation apparatus 57 radiates the hardening light after moving, sliding or shifting down to a predetermined position. Here, the light transmission layer forming mechanism EE shown in FIG. 1 is constituted from both a first hardening mechanism including: a light transmission layer forming portion 31; the simultaneous transfer mechanisms 43 and 45; the rotation operation apparatuses 47 and 49; and the hardening light radiation apparatus 55, and a second hardening mechanism including the hardening light radiation apparatus 57 and the like. It should be noted that it is possible to adjust or control warping or curving of the disc substrate by radiating the hardening light from both top and bottom sides of the disc Db and by controlling the strength of the hardening light from top and bottom sides. A concrete example of the hardening light radiation apparatus 57 is explained in a fifth embodiment.

On a terminal end portion of the transportation line 29, a disc saving portion 59 which is similar to the disc saving portion 20 is provided, and moreover, a starting end of the transportation line 61 which is a second transportation line of the second transportation mechanism and a transfer mechanism 63 are provided. The transportation line 61 is a portion of the second transportation mechanism; however, the transportation line 61 can independently conduct a transportation operation from the transportation line 29. The disc saving portion 59 is constituted from a disc mounting rotation table 59A and a spacer saving mechanism 59B, the disc mounting rotation table 59A has mounting portions which mount multiple, for example, 200 discs Db at four points, and the spacer saving portion 59B has multiple spacers not shown in the figures and which are used for providing spaces or gaps between the discs Db upon mounting the discs Db.

The hardening light radiation portion 57 provides a shading board or a covering board in order not to radiate the hardening light on the transportation line 29; therefore, it is possible to prevent the transportation line 29 from increasing the temperature.

The disc mounting rotation table 59A and the spacer saving mechanism 59B are similar to the disc mounting rotation table 21 and the spacer saving mechanism 25 described above; therefore, an explanation is omitted. The disc saving portion 59 is provided for saving the discs on the transportation lines 17 and 29 if a problem occurs in later steps of a production line in order not to waste the unfinished discs, that is, the discs still in progress, or for extracting or taking the unfinished disc as a sample. Therefore, in normal operation time, the transfer mechanism 63 transfers all the discs Db on the terminal end of the transportation line 29 to the transportation line 61. It should be noted that if the transfer mechanism 63 receives a fault occasion signal, the transfer mechanism 63 automatically transfers the disc Db on the transportation line 29 to the disc saving portion 59, and moreover, if the transfer mechanism 63 receives a fault recovery signal, the transfer mechanism 63 transfers the disc Db from the disc saving mechanism 59 to the transportation line 61. Moreover, by pushing a sampling button which is not shown in the figures, it is possible to transfer a predetermined number of discs Db to the disc saving portion 59.

On the transportation line 61, with respect to the disc Db transferred to the transportation line 61, first, a liquid material for hard coating is supplied to the disc Db by a liquid material supplying mechanism 65. The liquid material supplying mechanism 65 has a nozzle portion 65 which rotates approximately one time along with discharging the liquid material, and supplies the liquid material in a circular state on a predetermined position at an inner side of the disc Db which is transferred one by one on the transportation line 61. Compared to the liquid material for the light transmission layer described above, this liquid material has lower viscosity and to which a material that is appropriate for forming a hard coating layer with excellent mar-proof or abrasion-proof characteristics is used. The liquid material supplied on the disc Db in a doughnut state is extended at the rotation operation portion 67, and a hard coating layer e of, for example, 1-4 µm thickness shown in FIG. 4F is formed. The disc Db on which the hard coating layer e is formed is called a disc Dc. The rotation operation portion 67 is constituted from three simultaneous transfer mechanisms 69 with the same constitution and three rotation operation apparatuses 71 that conduct the rotation operation at a high speed, and three simultaneous transfer mechanisms 69 simultaneously transfer the discs Db on the transportation line 61 to the corresponding rotation apparatuses 71 and transfer the discs Dc after finishing rotation onto the transportation line 61. The liquid material supplying mechanism 65 is arranged at a position close to the transportation line 61 and the nozzle portion 65A is standing by above the transportation line 61; therefore, it is possible to reduce the operation time.

In a next step, as shown in FIG. 4G, the hard coating layer e is hardened because of the hardening light such as ultraviolet rays from a hardening light radiation apparatus 73 above. The hardening light radiation apparatus 73 has the same constitution as the hardening light radiation apparatus 57 and an explanation is omitted; however, the hardening light radiation apparatus 73 is provided only upside of the transportation line 61. The disc Dc is transferred from the transportation line 61 to a turntable mechanism 77 by a transfer arm 75a of a transfer mechanism 75 which has both the transfer arm 75a and a transfer arm 75b. The turntable mechanism 77 has four positions at 90-degree intervals for mounting the disc Dc and intermittently rotates 90 degrees each time. An obverse and reverse turning mechanism 79 is arranged at a point close to a position next to a position where the disc Dc is received from the transportation line 61, and turns obverse and reverse of the disc Dc. By operating obverse and reverse turning in such a manner, the back face of the disc substrate D comes up, and at the next position, as shown in FIG. 4H, a water-repellent layer f is formed on the back face of the disc substrate D by a layer forming apparatus 81 such as a sputtering apparatus. This water-repellent layer f is aimed to prevent warping or curving and to prevent a metal reflection layer from corrosion because the material of the disc substrate itself absorbs or imbibes water. The disc Dc on which the water-repellent layer f is formed is called a disc Dd.

When the disc Dd is returned to the original position on the turntable mechanism 77, another transfer arm 75 b of the transfer mechanism 75 transfers the disc Dd to a relay table 83. At this time, both the operation of transferring the disc Dc from the transportation line 61 to the turntable mechanism 77 by the transfer arm 75a of the transfer mechanism 75 and the operation of transferring the disc Dd from the turntable mechanism 77 to the relay table 83 by the transfer arm 75b of the transfer mechanism 75 are conducted simultaneously. The disc Dd mounted on the relay table 83 is transferred to an inspection portion 87 by the transfer arm 85a and the disc Dd inspected by the inspection portion 87 is transferred to another relay table 89 by the transfer arm 85b. At the inspection portion 87, the disc is inspected by radiating inspection light from a lower side or by using a CCD camera and the like in accordance with predetermined inspection items. In accordance with inspection results, a fine/non-defective product is transferred to a non-defective product mounting mechanism 93 and a defective product is transferred to a defective product mounting mechanism 95 by one of the transfer arms of the transfer mechanism 91, and the products are mounted or loaded one by one.

This selection or sorting operation of the transfer mechanism 91 is automatically conducted after receiving a signal which indicates the non-defective product or the defective product based on the inspection result of the inspection portion 87. The non-defective product mounting mechanism 93 has a generally used constitution and is not drawn in the figures in detail, and is constituted from a turntable and an optical disc mounting portion constituted from such as multiple stack poles that can mount or load multiple discs one by one. Moreover, another transfer arm of the transfer mechanism 91 transfers a spacer from a spacer saving portion 96 onto the non-defective product mounting mechanism 93. The spacers have a function of providing spaces or gaps between the mounted or saved, or loaded discs and of preventing the discs from being closely contacted. It should be noted that it although not shown in figures, a label is printed on the non-defective disc if necessary, and the optical disc applicable to high-density recording with one recording layer is completed.

Third Embodiment

As described above, this optical disc production apparatus 300 is constituted from two portions including a mechanism portion 300A and a mechanism portion 300B which are divided by a long-dashed-short dashed line, and both the mechanism portion 300A and the mechanism portion 300B are operated when the optical disc which includes two signal layers and which is applicable to high-density recording is produced. The mechanism portion 300A forms: the first signal layer a1; the first reflection layer b1; and the light transmission layer which is the cover layer, on the disc substrate, and the mechanism portion 300B constitutes a second signal layer forming mechanism that forms a light transmission layer including a second signal layer on the disc substrate which is transferred from the mechanism portion 300A and which includes the first signal layer a1 and the first reflection layer b1. In the third embodiment, in addition to FIG. 3, referring to FIG. 6A-E, FIG. 6F-I and FIG. 6J-L for explaining the production steps and FIG. 7 showing a portion of the optical disc production apparatus 300, a production of an optical disc including two signal layers is explained as an example of an optical disc. In FIG. 7, for easy understanding, a flow of the disc in a production step is shown by using solid line arrows and broken line arrows.

First, largely different points of the production of the optical disc including two signal layers from the above-described production of the optical disc including one signal layers are briefly explained.

(1) The disc Da, on which the reflection layer b1 is formed on the signal layer a1 of the disc substrate D as shown in FIG. 4B by the layer forming apparatus 19, is not transferred from the transport line 17 of the first transfer mechanism to the transportation line 29 of the second transportation mechanism, and is transferred to a transportation line 137 of a third transportation mechanism of the mechanism portion 300B by a simultaneous transfer mechanism 97 which transports between the mechanism portion 300A and the mechanism portion 300B.

(2) The disc which has the light transmission layer and on which the second signal layer a2 is transferred or printed at the mechanism portion 300B is transferred from the transportation line 137 to the transportation line 17 of the mechanism portion 300A by the simultaneous transfer mechanism 97.

(3) The layer forming apparatus 19 forms a semitransparent reflection layer as well on the second signal layer, that is, the layer forming apparatus 19 forms not only the first reflection layer but also the second reflection layer.

(4) The disc on which the semitransparent second reflection layer is formed is transferred from the transportation line 17 to the transportation line 29, and the light transmission layer which is the cover layer and the like are formed in the steps described above.

Figure 6A:
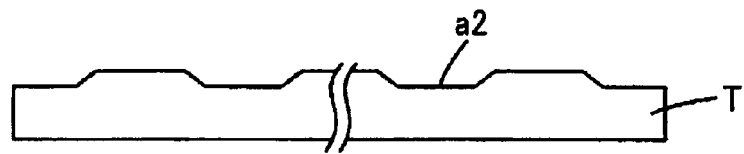
FIG. 6A is a figure showing production steps A-E of producing optical discs including two signal layers applicable to high-density recording by using the optical disc production apparatus 300 of the present invention.
Figure 7:
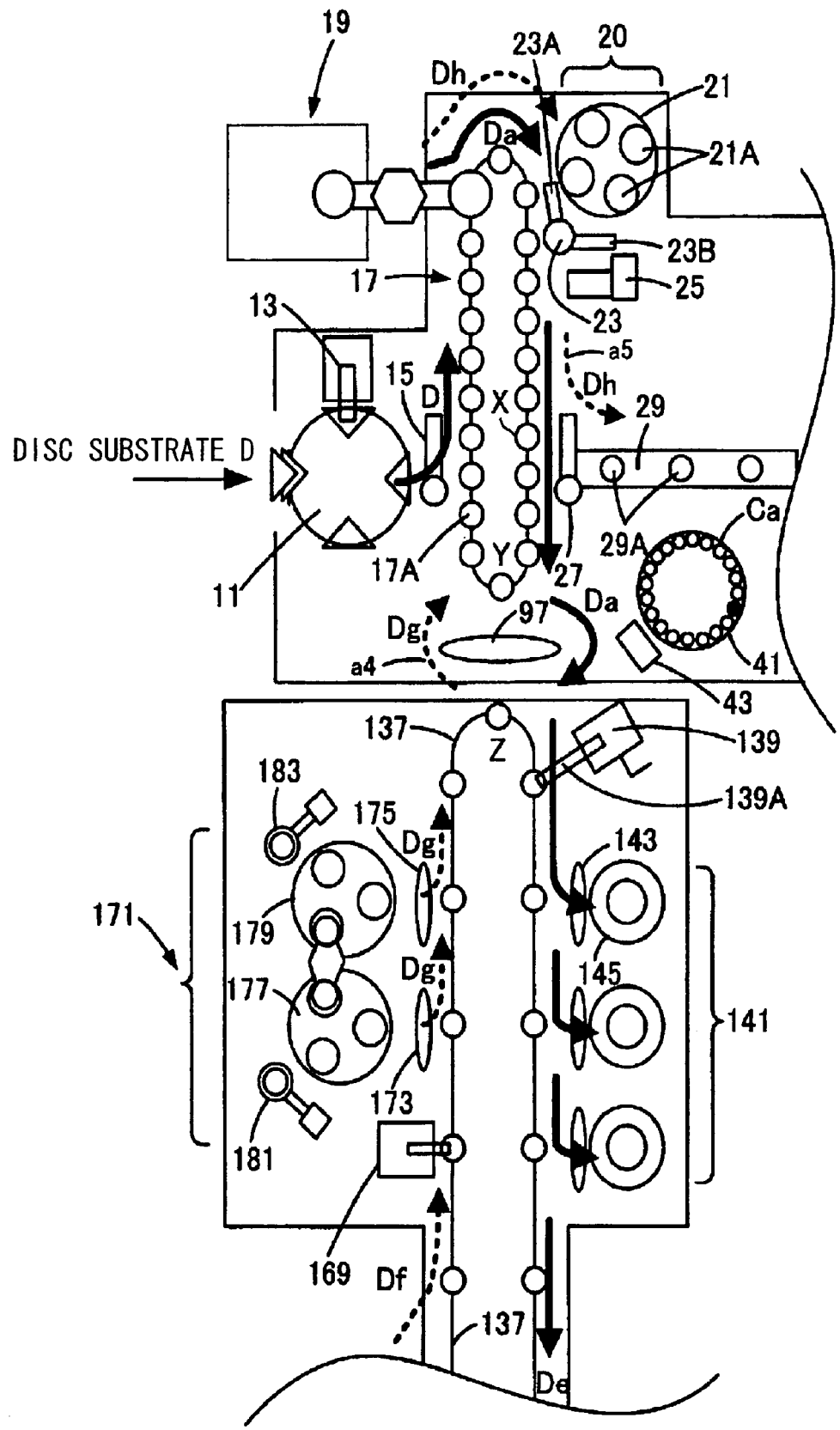
FIG. 7 is a figure showing a portion of the optical disc production apparatus 300 of the present invention.

At the mechanism portion 300B, the injection molding apparatus 101 to which a stamper which includes a metal mold with a desired recording groove for injection molding is attached, molds the printing/transferring disc substrate T including a second signal layer a2 shown in FIG. 6A by applying injection molding. The printing/transferring disc substrate T is made from a resin disc which is 120 mm in diameter and has a center hole of 15 mm diameter; however, this is not a limitation. On the signal layer a2, information signals are formed as pits that are in an uneven state with grooves or slits, and for easy explanation, the pits in the uneven state are, compared to the thickness of the printing/transferring disc substrate T, greatly zoomed up and shown. The printing/transferring disc substrate T is transferred to a cooling mechanism 105 which is set close to the injection molding mechanism 101 by a disc substrate takeout mechanism 103, and is cooled down by rotating or spinning.

The disc substrate takeout mechanism 103 and the cooling mechanism 105 are almost the same as the disc substrate takeout mechanism 3 and the cooling mechanism 5 and their operations are the same as well; therefore, their explanations are omitted. After rotating for a predetermined time, each of the rotation cooling apparatus of the cooling mechanism 105 stops rotating and, the transfer mechanism 107, along with keeping the printing/transferring disc substrate T in a vertical state, transfers to the aging mechanism 109 one by one. The transfer mechanism 107 and the aging mechanism 109 have almost the same constitutions as the transfer mechanism 7 and the aging mechanism 9 and their operations are the same as well; therefore, their explanations are omitted. The printing/transferring disc substrate T which is cooled down to be almost the same as room temperature at the aging mechanism 109 is passed to an intermittent rotation mechanism 111 one by one at an end portion of the aging mechanism 109, is turned over 180 degrees by an obverse and reverse turning mechanism 113 at a next position along with rotation of the intermittent rotation mechanism 111, and is in a horizontal state so as to maintain the second signal layer a2 facing upward. As described above, it is possible to apply the obverse and reverse turning mechanism 113 so as to rotate only when a rotation is needed. The printing/transferring disc substrate T, after further rotating by the intermittent rotation mechanism 111, at a next position, is transferred onto a transportation line 117 of a transportation mechanism for transferring or printing by a transfer mechanism 115.

A light transmission layer forming mechanism 119, which has the same constitution as the light transmission layer forming mechanism 31, which conducts the same operation as the light transmission layer forming mechanism 31, and which forms the light transmission layer on the printing/transferring disc substrate T, is provided along the transportation line 117 of the transportation mechanism for transferring or printing. The light transmission layer forming portion 119 has three sets of mechanisms and each of the sets includes: a liquid supplying mechanism 123 which supplies the liquid material to a simultaneous transfer mechanism 121 and the printing/transferring disc T; a rotation operation apparatus 125 which spreads, extends and/or flattens the liquid material on the printing/transferring disc T by conducting a high speed rotation operation; a transfer mechanism 127; a cap saving mechanism 129; and a cap cleaning mechanism 131. These three sets have the same mechanism and operate simultaneously.

Three simultaneous transfer mechanisms 121, which are the same as the simultaneous transfer mechanism 33, transfer and mount the printing/transferring disc substrates T on the transportation line 117 into the rotation operation apparatus 125, and simultaneously transfer and mount three printing/transferring disc substrates T in the rotation operation apparatus 125 onto the transportation line 117. Three simultaneous transfer mechanisms 121 conduct a transfer operation of the printing/transferring disc substrates T every three times the transportation line 117 conducts a transportation operation; therefore, it is possible to provide time for a rotation operation of the rotation operation apparatus 125 three times longer than a case of using one rotation operation apparatus 125.

The cap saving mechanism 129 is the same as the cap saving mechanism 41 and its details are not explained; however, the cap saving mechanism 129 obtains multiple cap materials Ca on a table which intermittently rotates. Every time the printing/transferring disc substrate T is transferred into the rotation operation apparatus 125, the transfer mechanism 127 mounts the cap material C1 from the cap saving mechanism 129 on a center aperture which is not shown in the figures of the printing/transferring disc substrate T so as to cover the aperture. The cap material Ca has a special structure in which both the center aperture of the printing/transferring disc substrate T and a center pin which is not shown in figures of the rotation operation apparatus 125 piercing the center aperture are covered. As described above, the disc substrate D has a center aperture diameter of 15 mm, its recording area has an inside diameter of 43-46 mm, and the light transmission layer a2 which is appropriate for the disc substrate D is needed to be formed. Therefore, an outside diameter of the cap material Ca is approximately 18-23 mm; however, this is not a limitation.

Figure 6B:
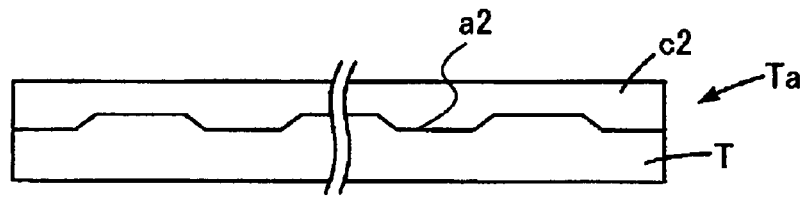
FIG. 6B is a figure showing production steps A-E of producing optical discs including two signal layers applicable to high-density recording by using the optical disc production apparatus 300 of the present invention.

After the center aperture of the printing/transferring disc substrate T is covered with the cap material Ca, the liquid supplying mechanism 123 supplies the liquid material to a center point or a surrounding area close to the center point of the cap material Ca. The liquid material is made from a clear material such as an acrylic resin and is made so as to have a viscosity and to form a light transmission layer several tens of micrometers in thickness by applying a spin-coating method. In a case in which the liquid material is supplied to the center point of the cap material Ca, the liquid material is supplied at one point or on one spot; however, in a case in which the liquid material is supplied to the surrounding area close to the center point of the cap material Ca, the liquid material is supplied in a state of a circle surrounding the center point. When the liquid material is supplied on the cap material Ca, the rotation operation mechanism 129 conducts a rotation operation at a high speed and spreads, extends and/or flattens the liquid material on the printing/transferring disc substrate T by using centrifugal force. FIG. 6B shows a printing/transferring disc substrate T on which the light transmission layer c2 is formed. The printing/transferring disc substrate T on which the light transmission layer c2 is formed is called a printing/transferring disc substrate Ta. The printing/transferring disc substrate Ta is transferred to the transportation line 117 by the simultaneous transfer mechanism 121. It is possible to form the light transmission layer c2 in a manner the same as the formation of the light transmission layer c1 explained in the first embodiment, and its explanation is omitted. Washing the cap Ca by a cap washing mechanism 131 is the same as above; therefore, its explanation is omitted. At this time, the light transmission layer c2 is not hardened or solidified yet. The printing/transferring disc substrate Ta which is transferred or mounted onto the transportation line 117 of the transportation mechanism for transferring or printing is transferred to the turntable mechanism 135 by the transfer mechanism 133.

On the other hand, the disc Da, on which the reflection layer b1 is formed on the first signal layer a1 of the disc substrate D as shown in FIG. 4B by the layer forming apparatus 19, is not transferred from the transportation line 17 to the transportation line 29, but is transferred from a second transfer position Y of the transportation line 17 to a transfer position Z of the transportation line 137 of the mechanism portion 300B by the simultaneous transfer mechanism 97 as shown in FIG. 7. The liquid material is supplied to the disc Da which is transferred to the position Z of the transportation line 137 one by one at a next position by the liquid material supplying mechanism 139. The liquid material supplying mechanism 139 has a nozzle portion 139A which rotates one time along with discharging the liquid material, and supplies the liquid material in a circular state on a predetermined position at an inner side of the disc Da which is transferred one by one on the transportation line 137. This liquid material is a resin material which is transparent and has excellent adhesiveness, and a typical one is an adhesive.

Figure 6C:
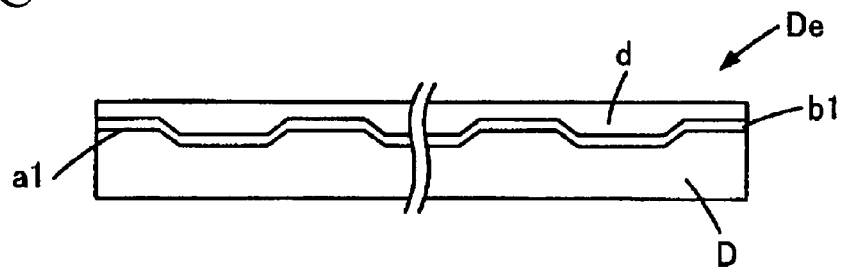
FIG. 6C is a figure showing production steps A-E of producing optical discs including two signal layers applicable to high-density recording by using the optical disc production apparatus 300 of the present invention.

A high-speed rotation operation is conducted upon the disc Da on which the liquid material is supplied by the rotation operation portion 141, and as shown in FIG. 6C, a thin adhesive layer d is formed on the reflection layer b1 by extending or spreading the liquid material. The disc Da on which the adhesive layer d is formed is called a disc De. The rotation operation portion 141 is constituted from both three simultaneous transfer mechanisms 143 which have the same constitution and three rotation operation apparatuses 145 which are generally used spinners. The simultaneous transfer mechanisms 143 simultaneously transfer the discs Da on the transportation line 137 to the corresponding rotation apparatuses 145, and at the same time, transfer the discs De after finishing rotation at the corresponding rotation apparatuses 145 onto the transportation line 137. A hardening or curing operation is not conducted on the adhesive layer d which is formed on the reflection layer b1 of the disc De, and the disc De is obtained by suction and is transferred onto the turntable mechanism 135 by the transfer arm 147A of the transfer mechanism 147. The turntable mechanism 135 intermittently rotates clockwise. A transfer operation of three simultaneous transfer mechanism 143 is conducted each three times of the intermittent transportation operation of the transportation line 137, and in this period, the rotation operation apparatuses respectively conduct a rotation operation.

Figure 6D:
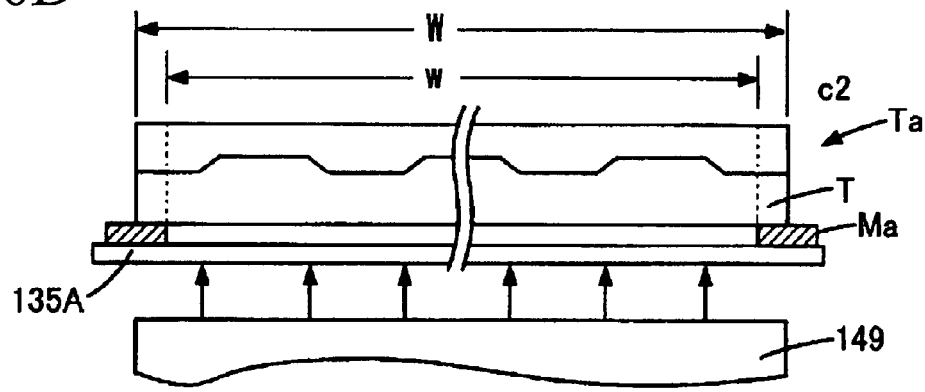
FIG. 6D is a figure showing production steps A-E of producing optical discs including two signal layers applicable to high-density recording by using the optical disc production apparatus 300 of the present invention.
Figure 6E:
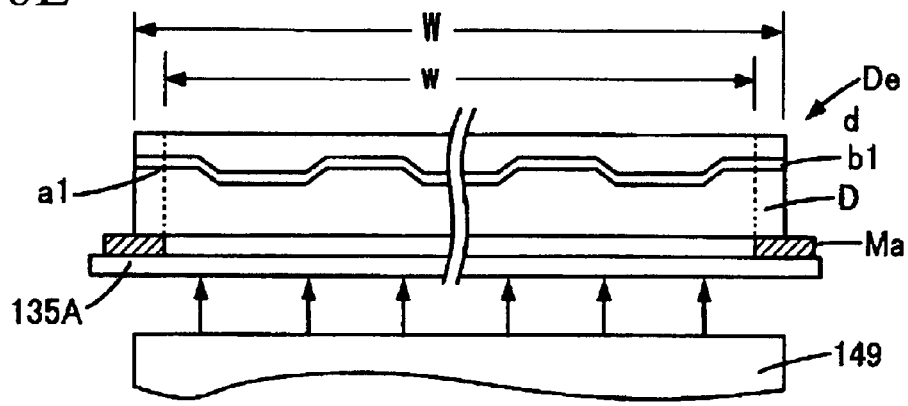
FIG. 6E is a figure showing production steps A-E of producing optical discs including two signal layers applicable to high-density recording by using the optical disc production apparatus 300 of the present invention.

The turntable mechanism 135 has four mounting tables 135A at 90-degree intervals. Each mounting table 135A is made from a heat-resisting light transmission material such as quartz, and as indicated by a solid line arrow in FIG. 13, the discs De are mounted on two of four facing mounting tables 135A. As indicated by a broken line arrow of FIG. 13, onto two empty mounting tables 135A on which the disc De is not mounted, the printing/transferring discs Ta described above are transferred from the transportation line 117. Along with intermittent rotation of the turntable mechanism 135, at a next position from a position where the printing/transferring disc Ta is transferred from the transportation line 117, as shown in FIG. 6D, a first hardening step in which hardening light such as UV from a hardening light radiation apparatus 149 provided under it is radiated on the light transmission layer c2 which is not shaded or covered by the mask member Ma the same as above on the disc Ta for transferring or printing is operated. In the same manner, as shown in FIG. 6E, the hardening light is radiated on a portion which is not shaded on the adhesive layer d of the disc De transported from the transportation line 137. This first hardening step is operated through the mounting table 135A. Here, W in FIG. 6D and FIG. 6E is an outside diameter of the printing/transferring disc substrate T or the disc substrate D, and w is an inner diameter of the mask member Ma. The inner diameter w of the mask member Ma is smaller than the outside diameter of the printing/transferring disc substrate T or the disc substrate D. The adhesive layer d of the disc De on which the hardening light is radiated and the light transmission layer c2 of the printing/transferring disc substrate Ta is cured or semi-cured; however, the outside edge portion which is shaded or covered by the mask member Ma is not hardened and is transported to a next position. At the next position, the transfer mechanism 151 alternately transfers the disc Ta for transferring or printing and the disc De one by one, the printing/transferring disc Ta is transferred to the mounting table 153A of the obverse and reverse turning mechanism 153 by sucking and maintaining its inside edge portion on which the light transmission layer c2 is not formed, and the disc De is transferred to the mounting table 155 by sucking and maintaining its inside edge portion on which the adhesive layer d is not formed. It is possible to radiate the hardening light from upside of the turntable mechanism 135 instead of radiating from downside. In this case, in order to prevent contacting the adhesive layer d of the disc De or the light transmission layer c2 of the printing/transferring disc Ta, the mask member Ma should be provided at an upward position from them with a small distance or gap. A concrete example of the mask member Ma is explained in a sixth embodiment.

The printing/transferring disc Ta on the mounting table 153A of the obverse and reverse turning mechanism 153 is mounted on the mounting table 153B after turning over the upper surface and the lower surface. By conducting this turnover operation, the light transmission layer c2 formed on the printing/transferring disc Ta appears on a lower side. As described above, at least the outside edge portion of the light transmission layer c2 is not hardened; therefore, the mounting tables 153A and 153B preferably have a size for supporting the inside edge portion on which the light transmission layer c2 of the printing/transferring disc Ta is not formed. With respect to a turning operation of the obverse and reverse turning mechanism 153, it is possible to apply a structure which is already proposed by the applicant of the present invention (for example, Japanese Patent Application, First Publication No. H5-277427 or H8-131928) such as: a structure in which the printing/transferring disc Ta is turned and mounted on the mounting table 153B after turning 180 degrees in a state in which the printing/transferring disc Ta is maintained by suction; or a structure in which the outside edge portion of the printing/transferring disc Ta is maintained or held at a position where it is mounted and is turned over by turning 180 degrees.

The transfer mechanism 157 maintains the inside edge portion on which the adhesive layer d is not formed on the disc De mounted on the mounting table 153 by suction, and first, transfers the disc De to a position a on the turntable mechanism 159. Next, the transfer mechanism 157 transfers the printing/transferring disc Ta on the mounting table 153B onto the disc De. The turntable mechanism 159 has multiple mounting positions, and at the mounting position, in order to maintain the printing/transferring disc Ta along with keeping a certain distance from the disc De, a maintaining member which is inserted into a center aperture of the disc De and/or a center aperture of the printing/transferring disc substrate T and which is not shown in the figures is provided. By using this maintaining member, it is possible to transport to a vacuumed combining mechanism 161 along with keeping a state in which the printing/transferring disc Ta is separated from the disc De with a certain gap between them.

It is an important point that the adhesive layer d of the disc De faces upward; therefore, an unhardened portion of the outside edge portion, which has a swelling or a protrusion of the adhesive, is flattened because of the influence of gravity before conducting adhering in a next step. The outside edge portion of the adhesive layer d of the disc De and the outside edge portion of the light transmission layer c2 of the printing/transferring disc Ta are kept in a semi-cured or uncured state; therefore, upon adhering by setting them together in a vacuum, a thickness of the outside edge portion is adjusted and an overall thickness including both the inside edge and outside edge is uniform.

A vacuumed combining mechanism 161 is constituted so as to include two positions b and c, and has two cylindrical chambers which are not shown in figures, which are slightly larger than an external size of the disc substrate, and which are respectively arranged above the positions b and c. Two cylindrical chambers are in a waiting state above the positions b and c while the turntable mechanisms 159 are intermittently conducting a rotation operation, and drop so as to create or provide small tightly closed spaces between the cylindrical chambers and the turntable mechanisms 159, and these small tightly closed spaces are vacuumed by operating the vacuum pump apparatus, which is not shown in figures. When two pairs of both the printing/transferring disc Ta and the disc De, which are maintained in a state in which the pair of the discs are facing with a certain interval or gap between them, are formed one by one at the position a of the turntable mechanism 159 and the pairs are transported to the positions b and c, two chambers which are not shown in figures drop down in order to make two positions b and c vacuumed and the printing/transferring disc Ta is put on the disc De, and a pressure can be applied on the discs. According to such a manner, it is possible to adhere or arrange two discs together without including bubbles between both the light transmission layer c2 of the printing/transferring disc Ta and the adhesive layer d of the disc De. It should be noted that it is not necessary to adhere or arrange the discs together in the vacuumed atmosphere, and it is possible to adhere or arrange the discs together in a state in which the adhesive layer d is slightly contacting the light transmission layer c2 along with relatively rotating the discs with a rotation difference as suggested by the applicant (for example, Japanese Patent Application, First Publication No. H09-63127). In this case, it is preferable not to conduct the first hardening of the adhesive layer d. Moreover, when the discs are adhered in the vacuumed atmosphere, the swelling unhardened portion of the outside edge portion of the light transmission layer c2 on the printing/transferring disc Ta is already flattened because of gravity; therefore, it is possible to turn over so as to make the printing/transferring disc Ta upper side and the disc De down side and to adhere the discs. A concrete example of the vacuumed combining mechanism 161 is explained in a seventh embodiment.

Figure 6F:
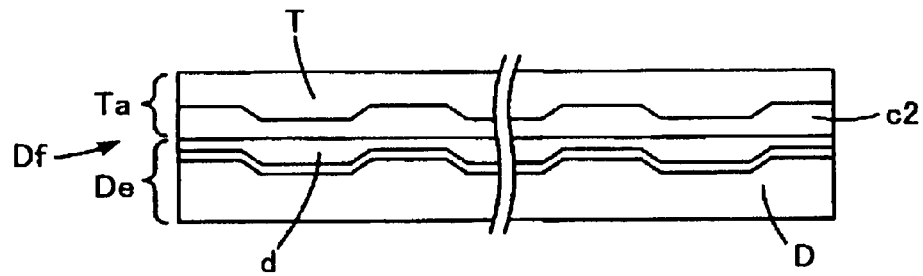
FIG. 6F is a figure showing production steps A-E of producing optical discs including two signal layers applicable to high-density recording by using the optical disc production apparatus 300 of the present invention.
Figure 6G:
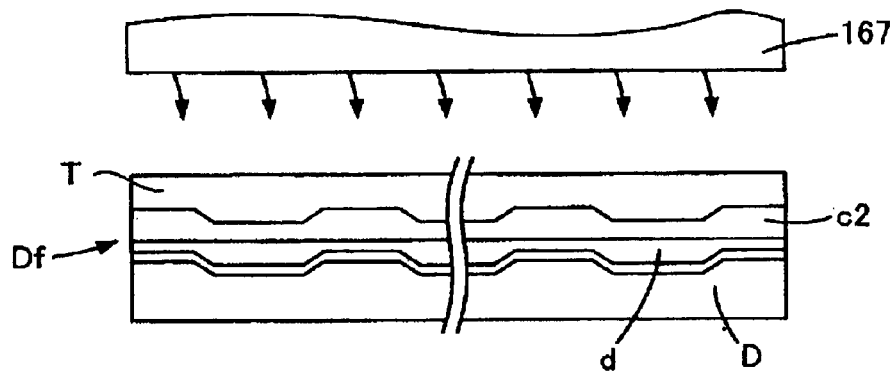
FIG. 6G is a figure showing production steps A-E of producing optical discs including two signal layers applicable to high-density recording by using the optical disc production apparatus 300 of the present invention.
Figure 6H:
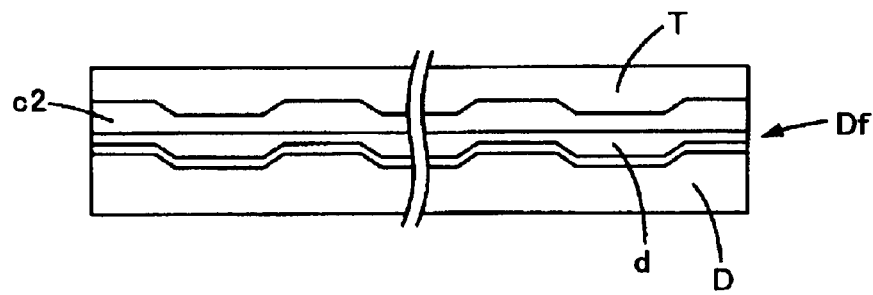
FIG. 6H is a figure showing production steps A-E of producing optical discs including two signal layers applicable to high-density recording by using the optical disc production apparatus 300 of the present invention.

As shown in FIG. 6F, the disc Df which is made by adhering both the printing/transferring disc Ta and the disc De is transferred to a turntable mechanism 165 by the transfer mechanism 163 at the position d of the turntable mechanism 159. The turntable mechanism 165 has the same structure as the turntable mechanism 135; therefore, its explanation is omitted. As shown in FIG. 6G, a second hardening is conducted on the disc Df which is mounted on a mounting table 165A that is made from a transparent material, which is shown in a circle, and which is included in the turntable mechanism 165, by radiating ultraviolet from upside by a hardening light radiation apparatus 167. In this second hardening step, the hardening light is radiated from upside over all the adhesive layer d and the light transmission layer c2; therefore, the unhardened portions of the adhesive layer d and the light transmission layer c2 are completely hardened.

Figure 6I:
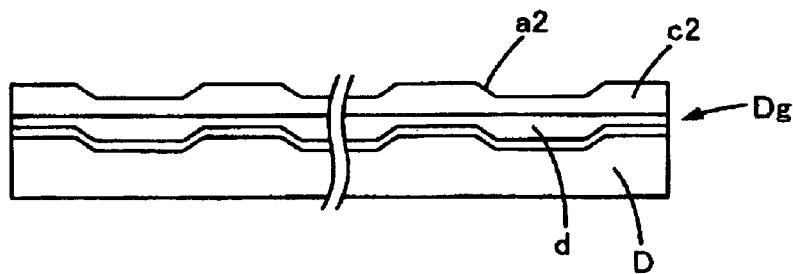
FIG. 6I is a figure showing production steps A-E of producing optical discs including two signal layers applicable to high-density recording by using the optical disc production apparatus 300 of the present invention.

The disc Df (FIG. 6H) on which the second hardening operation is conducted is transferred onto the transportation line 137 by the transfer arm 147B of the transfer mechanism 147. Both an operation of transferring the disc Df from the turntable mechanism 165 to the transportation line 137 and an operation of transferring the disc De from the transportation line 137 to the turntable mechanism 135 are simultaneously conducted by the transfer arm 147B and the transfer arm 147A of the transfer mechanism 147. As shown in FIG. 6I, next, the printing/transferring disc substrate T is removed from the light transmission layer c2 by a peeling mechanism 171, and the second signal layer a2 is printed on the light transmission layer c2. The peeling mechanism 171 is roughly constituted from: two transfer mechanisms 173 and 175; peeling mechanisms 177 and 179; and printing/transferring disc removing mechanisms 181 and 183. It should be noted that if the transportation is conducted in a state in which the printing/transferring disc Ta is at a lower side and the disc De is at an upper side, an operation of turning obverse to reverse is conducted by the obverse and reverse turning mechanism 169 before a step of the peeling mechanism 171 so as to arrange the printing/transferring disc Ta at the upper side and the disc De at the lower side.

As shown in FIG. 7, the peeling mechanisms 177 and 179 conduct a peeling operation at a next position when the discs Df are transferred from the simultaneous transfer mechanisms 173 and 175. With respect to this peeling operation, as proposed by the applicant (for example, Japanese Patent Application, First Publication No. 2002-197731), a mechanical force is applied between the printing/transferring disc substrate T and the light transmission layer c2 for printing/transferring from a center aperture side of the disc Df, a portion between them is peeled and separated, and compressed air is supplied between them; therefore, it is possible to accurately and easily peel without causing a bad influence on the light transmission layer c2. It should be noted that the peeling mechanism 171 is not limited to be the peeling mechanism described above. The printing/transferring disc substrate T which is peeled is removed by the printing/transferring disc removing mechanisms 181 and 183 at a next position. The disc Df from which the printing/transferring disc substrate T is removed and on which the printing/transferring light transmission layer c2 is printed is called a disc Dg. The disc Dg is transferred onto the transportation line 137 by the simultaneous transfer mechanisms 173 and 175. Naturally, the discs Df are simultaneously transferred to the peeling mechanisms 177 and 179 from the transportation line 137. A concrete example of the peeling mechanisms 177 and 179 is explained in an eighth embodiment.

In an interval from a position Z of the transportation line 137 to a position Y of the transportation line 17, the disc Dg is transferred onto the disc mounting portion 17A by the simultaneous transfer mechanism 97. Here, as shown with circles, multiple disc mounting portions 17A are provided with a predetermined interval and the disc Dg is mounted on every second disc mounting portion 17A. On the disc mounting portion 17A on which the disc Dg is not mounted, the disc substrate D which is injection-molded is transferred by the transfer mechanism 15. Therefore, the disc substrate D is mounted on the every second disc mounting portion 17A.

A transportation speed of the transportation line 17 is variable; therefore, it is possible to be applied to a production of the optical disc which has one or two signal layers. Compared to the production of the optical disc which has one signal layer, in a case of the production of the optical disc which has two signal layers, by changing the transportation speed to be two times faster, it is possible to alternately mount both the disc substrate D on which the first signal layer is formed and the disc Dg on which the second signal layer is formed onto the disc mounting portions 17A and to transport them.

Figure 6J:
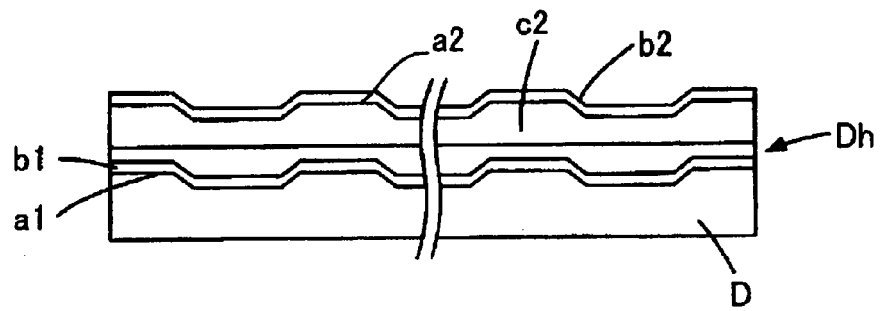
FIG. 6J is a figure showing production steps A-E of producing optical discs including two signal layers applicable to high-density recording by using the optical disc production apparatus 300 of the present invention.

The layer forming apparatus 19 alternately forms the reflection layer b1 on the first signal layer a1 of the disc substrate D shown in FIG. 4B and, as shown in FIG. 6J, forms a second reflection layer b2 which is made from Au, Ag, Si, Al, Ag alloy, or the like and which is semitransparent on the light transmission layer c2 which has the second signal layer a2 of the disc Dg.

In accordance with such a constitution and operation, it is not necessary to provide an extra layer forming apparatus in order to produce the optical disc of two signal layers; therefore, it is economically advantageous.

The disc Dg on which the second reflection layer b2 is formed is called a disc Dh. Therefore, on the transportation line 17 after the layer forming apparatus 19, both the disc Da on which the reflection layer b1 is formed on the first signal layer a1 of the disc substrate D and the disc Dh are alternately transported. As described above, when a problem or the like occurs, the disc saving portion 20 mounts both the disc Da and the disc Dh onto the mounting portion 21A of the disc mounting rotation table 21 by using the transfer arm 23A of the transfer mechanism 23. On the other hand, when the problem or the like is resolved, both the disc Da and the disc Dh are alternately transferred from the mounting portion 21A of the disc mounting rotation table 21 to the transportation line 17.

Figure 6K:
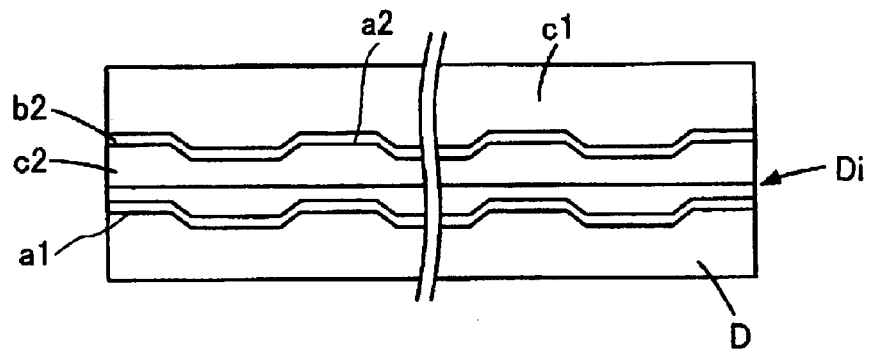
FIG. 6K is a figure showing production steps A-E of producing optical discs including two signal layers applicable to high-density recording by using the optical disc production apparatus 300 of the present invention.
Figure 6L:
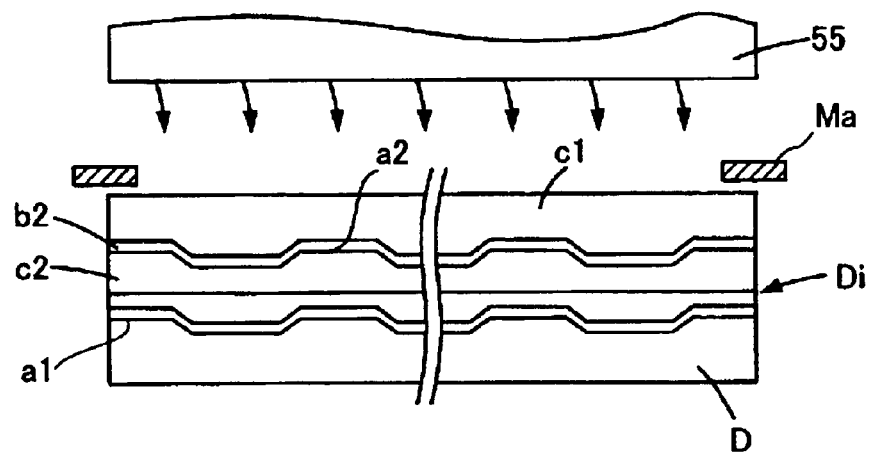
FIG. 6L is a figure showing production steps A-E of producing optical discs including two signal layers applicable to high-density recording by using the optical disc production apparatus 300 of the present invention.

At the transfer position X of the transportation line 17, only the disc Dh is transferred onto the transportation line 29 by the transfer mechanism 27. The disc Da is transported as it is on the first transportation line 17. Next, as shown in FIG. 6K, the light transmission layer c1 which is a cover layer is formed on the semitransparent reflection layer b2 by the light transmission layer forming portion 31. A constitution of the light transmission layer forming portion 31 and a forming method of the light transmission layer c1 are already explained in detail in the second embodiment; therefore, the explanation is omitted; however, compared to a case of one signal layer, the light transmission layer c1 is thinner and a thickness of the light transmission layers c1 plus c2 is approximately 100 μm. Next, as shown in FIG. 6L, the first hardening step of the light transmission layer c1 is operated by the hardening light radiation apparatus 55. Moreover, a second hardening step of the light transmission layer c1 is operated by the hardening light radiation apparatus 57. The disc on which the light transmission layer c1 is formed is called a disc Di. In the same manner as described above, a hard coating layer is formed on the light transmission layer c1 of this disc Di, after that, the disc Di is inspected and along with turning over, the disc Di is determined to be a non-defective product or a defective product. Moreover, a water-repellent layer is formed on the disc substrate if necessary.

In accordance with the above-described steps, it is possible to produce the optical disc which has two signal layers and which is applicable to high-density recording. In other words, in the present invention, by using the same production apparatus, it is possible to selectively produce the optical discs which have one signal layer and/or two signal layers and which are applicable to high-density recording.

It should be noted that in the above-described embodiments, it is naturally possible to apply other things in place of mechanisms or apparatuses such as: the cooling mechanism; the light transmission layer forming portion; the hardening light radiation apparatus; the rotation operation portion for forming the adhesive layer; the combining mechanism; and the peeling mechanism. Moreover, it is not always necessary to provide such as: the disc saving portion 20; the disc saving portion 59; the hardening light radiation apparatus for conducting the first hardening operation; and a water-repellent layer forming mechanism, and it is possible to apply other things which have different constitutions if necessary. Moreover, it is possible that the simultaneous transfer mechanism be a pair of transfer mechanisms which conduct a transfer operation along with moving in opposite directions to each other.

Fourth Embodiment

Figure 8A:
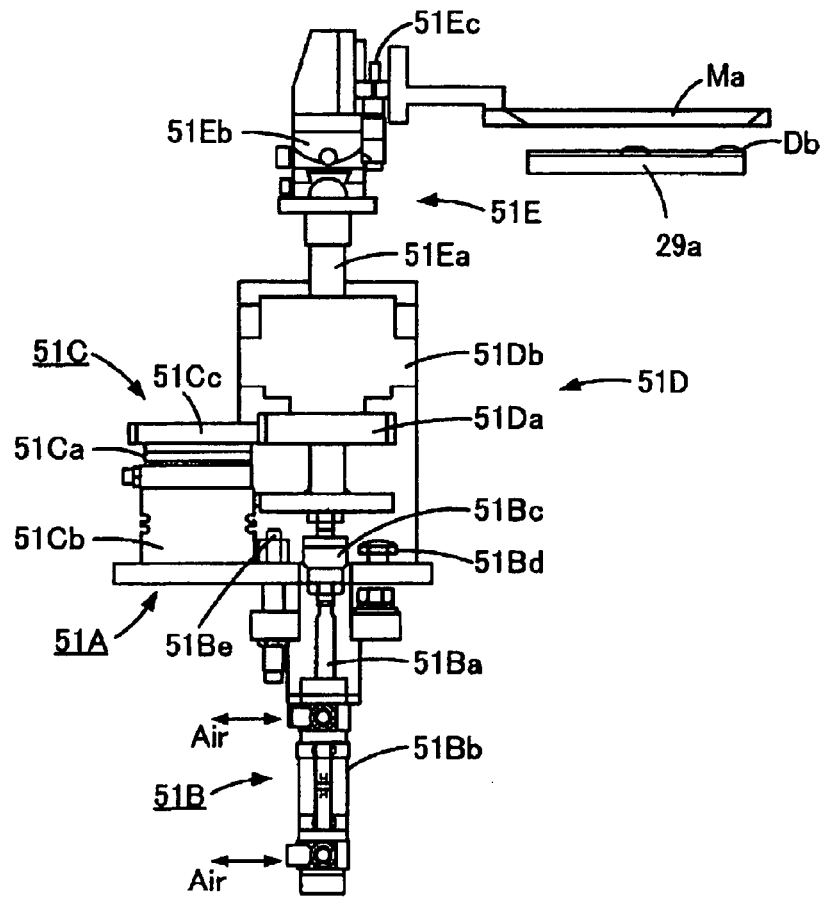
FIG. 8A is a figure showing an example of a mask driving mechanism applied to the optical disc production apparatus 300 of the present invention.

This embodiment explains an example of the above-described second embodiment. In an explanation below, FIGS. 8A and B are referred to. FIGS. 8A and B are figures which show an example of the mask driving mechanism applied to the optical disc production apparatus 300. Hereinafter, only differences from the second embodiment are explained.

Based on results of various experiments of the mask member Ma in a case of using the disc substrate D which has a diameter of 120 mm, with respect to both w which is an inner diameter of the mask member Ma and W which is an outside diameter of the disc substrate D, it was found that the inner diameter w should be equal to or more than 90% of the outside diameter W of the disc substrate D and be in a region which is smaller than the outside diameter W of the disc substrate D (W>w≧0.9 W). If the inner diameter w of the mask member Ma is smaller than 90% of the outside diameter W of the disc substrate D, a flat portion which is slightly inside from the most outside edge area is not semi-cured or cured; therefore, there is a possibility in which this area is thin and there is an undesired influence on the flatness of the light transmission layer c1. Moreover, if an outside diameter of the mask member Ma is smaller than the outside diameter W of the disc substrate D, in the first hardening step, by radiating the hardening light directly or indirectly on an outside edge surface of the disc substrate D, the material forming the light transmission layer c1 of the outside edge surface is semi-cured or cured; therefore, effects of the first hardening step are reduced by half or greatly and it is not possible to sufficiently flatten the light transmission layer c1. It should be noted that with respect to the diameter of the disc substrate D being smaller or larger than 120 mm, if the inner diameter w of the mask member Ma is in the range (W>w≧0.9 W), the same effects can be obtained.

Referring to FIGS. 8A and B, the mask driving mechanisms 51 and 53 are explained in detail. Both the mask driving mechanisms 51 and 53 have the same constitution; therefore, only the mask driving mechanism 51 is explained. The mask driving mechanism 51 is constituted from: a base portion 51A which is fixed on a fixed structural object that is not shown in the figures; a vertically movable portion 51B; a gyrate drive portion 51C; rotationally/vertically movable portion 51D; a mask supporting portion 51E; and the like. The vertically movable portion 51B is constituted from an air cylinder 51Bb which has a cylinder rod 51Ba that vertically moves by sucking and discharging the air, and the like, and the cylinder rod 51Ba extends upward along with piercing an aperture portion of the base portion 51A. An upper portion of the cylinder rod Ba is connected to the rotationally and vertically movable portion 51D via a floating joint 51Bc. Moreover, the vertically movable portion 51B is attached to the base portion 51A and has both a stopper member 51Bd which regulates a lower limit of the mask member Ma and a damper-and-stopper member 51Be for absorbing an impact and vibration caused when the mask member Ma contacts the stopper member 51Bd, and the stopper member 51Bd and the damper-and-stopper member 51Be make it possible to stably and horizontally stop or maintain the mask member Ma at a lower limit position without leaning.

The gyrate drive portion 51C is mainly constituted from: a rotatable table 51Ca; a rotation drive mechanism 51Cb which can rotate this rotatable table 51Ca at a certain degree in both directions; and a gear 51Cc in a circular shape which is connected to the rotatable table 51Ca and which rotates in accordance with rotation of the rotatable table 51Ca. Cogs of the gear 51Cc are engaged or geared to cogs of the gear 51 Da of the rotationally and vertically movable portion 51D, and a shaft of the gear 51 Da is connected to a rotationally and vertically movable mechanism 51Db which has a structure in which a radial bearing and a linear drive bearing (not shown in figures) are combined. The rotationally and vertically movable mechanism 51Db is connected to an axis portion 51Ea of the mask supporting portion 51E. The mask supporting portion 51E is mainly constituted from: the axis portion 51 Ea; an angle adjustment. Mechanism 51Eb such as a goniometer which can adjust an angle of a direction from a front surface to a back surface or the back surface to the front surface of the mask member Ma and an angle from right to left or left to light on the surface of the mask member Ma; a vertically fine-tuning mechanism 51Ec; and the like, and the mask member Ma is connected to the vertically fine-tuning mechanism 51Ec and is supported.

Figure 8B:
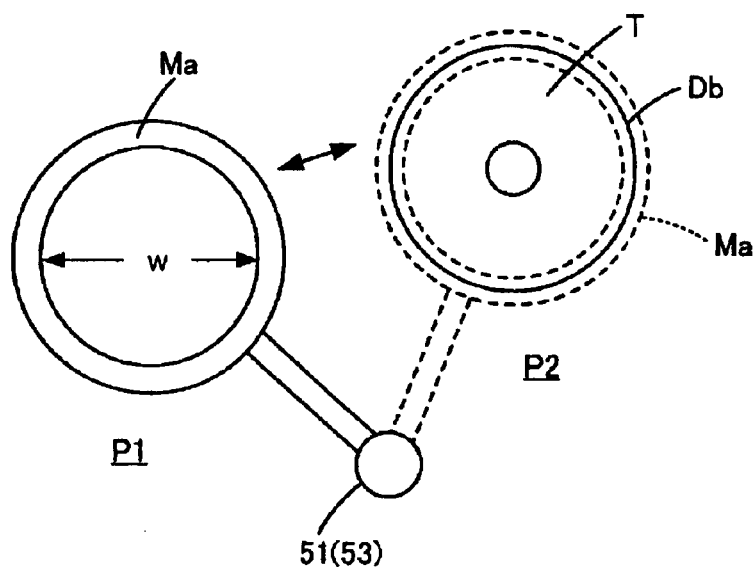
FIG. 8B is a figure showing an example of a mask driving mechanism applied to the optical disc production apparatus 300 of the present invention.

An operation of the mask driving mechanism 51 is explained next. When the mask member Ma is set at an origin point P1, the cylinder rod 51Ba of the vertically movable portion 51B is in a state in which it has moved upward. When the disc Db on which the light transmission layer c1 not shown in FIG. 4C is formed is transferred from the transportation line 29 to the rotation apparatus 47, the gyrate drive portion 51C of the mask driving mechanism 51 starts moving and its rotation drive mechanism 51Cb rotates the rotatable table 51Ca at a certain rotation angle. Along with this operation, the gear 51 Cc in a circular shape is rotated, the gear 51D of the rotationally and vertically movable portion 51D is rotated, the mask supporting portion 51E is rotated because the rotationally and vertically rotatable mechanism 51Db is rotated at a predetermined angle, the mask member Ma which is supported by the mask supporting member 51E is gyrated or moved on a arc line at a predetermined angle, and the mask member Ma is gyrated or moved on a arc line from the origin point P1 to a masking point P2 above the rotation operation apparatus 47 as drawn with a broken line in FIG. 8B. Next, the cylinder rod 51Ba of the vertical movable portion 51B moves downward by a predetermined amount. In this step, an angle adjustment of the mask member Ma is conducted so as to make the mask member Ma accurately parallel to the disc Db beforehand by the angle adjustment mechanism 51Eb, and moreover, the vertically fine-tuning mechanism 51Ec adjusts the height so as to be at a position which does not contact the upper surface of the disc Db and which is very close to the upper surface of the disc Db. Therefore, when the mask member Ma is at the masking position P2, both a center of the mask member Ma and a center of the disc Db are approximately at the same position or overlapped, and the mask member Ma is parallel to the disc Db along with having a slight gap or interval between them.

When the hardening light such as UV from the hardening light radiation mechanism 55 shown in FIG. 3 is radiated on the light transmission layer c1 of the disc Db via a blank portion T which is surrounded by the inner diameter w of the mask member Ma, first, the rotationally and vertically movable portion 51D, the mask supporting portion 51E, and the like are raised because the cylinder rod 51B of the vertical drive portion 51B moves upward, and the mask member Ma is raised as well. Almost at the same time as this step, the gyrate drive portion 51C moves; therefore, the gear 51Cc of the gyrate drive portion 51C and the gear 51Da of the rotationally and vertically movable portion 51D are rotated, and the mask member Ma is rotated at a predetermined angle because the mask supporting member 51E is rotated. Just after this step, the simultaneous transfer mechanism 43 returns the disc Db of the rotation operation apparatus 47 onto the transportation line 29. The mask member Ma is returned to the original position P1 shown in FIG. 8B in order to prepare for a next operation cycle. The mask transfer mechanism portion 53 conducts the same operations as the mask transfer mechanism 51; therefore, the explanation is omitted.

Fifth Embodiment

Figure 9A:
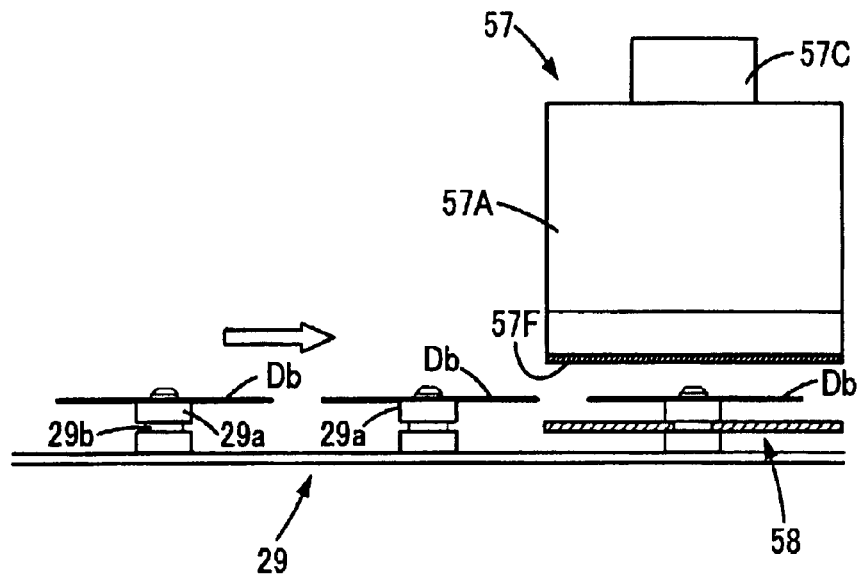
FIG. 9A is a figure showing an example of a hardening light irradiation apparatus applied to the optical disc production apparatus 300 of the present invention.
Figure 9B:
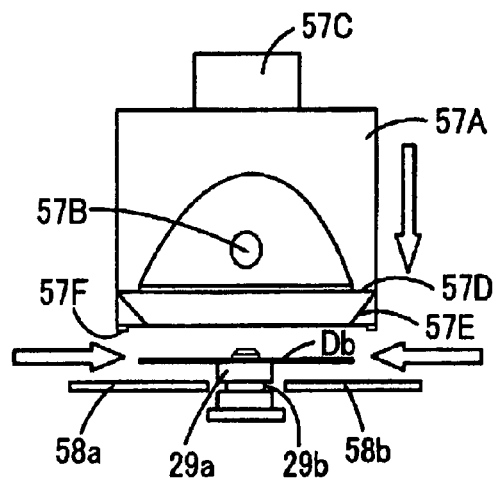
FIG. 9B is a figure showing an example of a hardening light irradiation apparatus applied to the optical disc production apparatus 300 of the present invention.
Figure 9C:
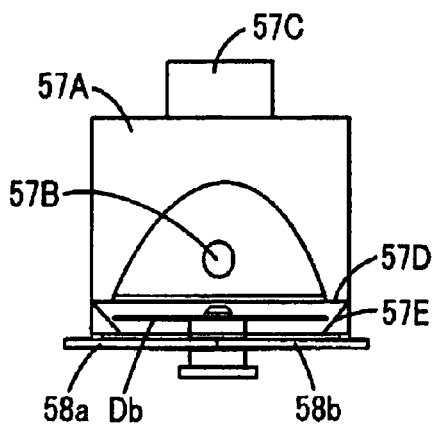
FIG. 9C is a figure showing an example of a hardening light irradiation apparatus applied to the optical disc production apparatus 300 of the present invention.

This embodiment explains one example of the above-described second embodiment. In the explanation below, FIG. 9A-C are referred to. FIG. 9A-C shows one example of the hardening light radiation apparatus which is applied to the optical disc production apparatus 300. Hereinafter, only differences from the second embodiment are explained.

In the above-described second hardening step, in order to radiate the hardening light from the upper side of the disc Db as shown in FIG. 4E, the hardening light radiation apparatus 57 like a flash lamp apparatus is provided above the hardening position of the transportation line 29 as shown in FIG. 9A-C. As shown in FIG. 9B which is an outline figure, the hardening light radiation apparatus 57 is constituted from: a shell enclosure portion 57A which is a shading cover; a hardening light lamp 57B such as a flash lamp that is provided inside the shell enclosure portion 57A; an exhaust portion 57C such as a fan which is provided at an upper portion of the shell enclosure portion 57A and which exhausts in order to prevent an inside temperature from rising unnecessarily higher; a lamp supporting portion 57D which extends from an inside wall of the shell enclosure portion 57A to an inside direction and which supports the hardening light lamp 57B; and a reflection plate portion 57E which reflects the light from the hardening light lamp 57B to a circumference portion of the disc Db in order to harden or cure an unhardened portion of the light transmission layer c1 adhered on the circumference portion. Moreover, a shading seal 57F is provided at a lower surface of the shell enclosure portion 57A in order to improve the shading effect. With respect to other portions, a shutter member 58 which cooperates with the shell enclosure portion 57A is provided so as to form a tightly closed space in order to prevent the hardening light from leaking. With respect to the shutter member 58 which is not explained in details: the shutter member 58 is constituted from two shading plates 58a and 58b which are movable back and forth in a right angle direction against a forwarding direction of the transportation line 29; portions which contact a cylindrical axis portion 29b of the mounting table 29a of the transport line 29 are notch portions which are in a semicircular shape; and on the other hand, two shading plates 58a and 58b contact each other at portions, upside of one of the plates is thinner at the contacting portion by cutting off or grinding and downside of another shading plate is thinner at the contacting portion by cutting off or grinding in order to overlap the upside and the downside at the contacting portions.

The hardening light radiation apparatus 57 is constituted so as to be able to synchronously move up and down in accordance with the intermittent transportation operation of the transportation line 29, and when the transportation line 29 intermittently stops, as shown in FIGS. 9A and B, the hardening light radiation apparatus 57 moves down until it reaches a predetermined position. At this time, the shading plates 58a and 58b of the shutter member 58 which are at positions above the mounting table 29a of the transportation line 29 and which are positioned with a gap or an interval so as not to prevent the transportation, respectively move to right angle directions (directions of arrows) against the forwarding direction of the transportation line 29. The shading seal 57F of a bottom end of the shell enclosure portion 57A contacts the upper surface of the shutter material 58 and the tightly closed space is formed. Inside this tightly closed space, the disc mounting receiving base 29a and the disc Db exist. In this state, the hardening light lamp 57B radiates. The ultraviolet ray from the hardening light lamp 57 directly radiates onto the flat light transmission layer c1 of the disc Db, and the ultraviolet rays reflected by the reflection plate portion 57E radiate on the light transmission layer which is formed on the circumference portion; therefore, the light transmission layer is hardened overall and becomes the light transmission layer. At this time, the exhaust portion 57C exhausts the air in the tightly closed space.

After finishing radiation of ultraviolet rays from the hardening light lamp 57B, both the hardening light radiation apparatus 57 and the shutter member 58 approximately simultaneously start operations, the hardening light radiation apparatus 57 moves upward, and the shutter member 58 moves at a right angle against a transportation direction of the transportation line 29 that is an opposite direction of the arrow. When the hardening light radiation apparatus 57 and the shutter member 58 return to the original positions, the transportation line 29 restarts transportation. The hardening light radiation apparatus 57 and the shutter member 58 prepare for operations of a next cycle. It is possible to understand from FIG. 9C that it is appropriate if two shading plates 58a and 58b of the shutter member 58 face each other along with having a distance or an interval by which both of them do not contact the mounting table 29a. Ultraviolet rays are not radiated on the transportation line 29 because of the shutter member 58; therefore, it is possible to prevent the temperature of the transportation line 29 rising.

Sixth Embodiment

Figure 10A:
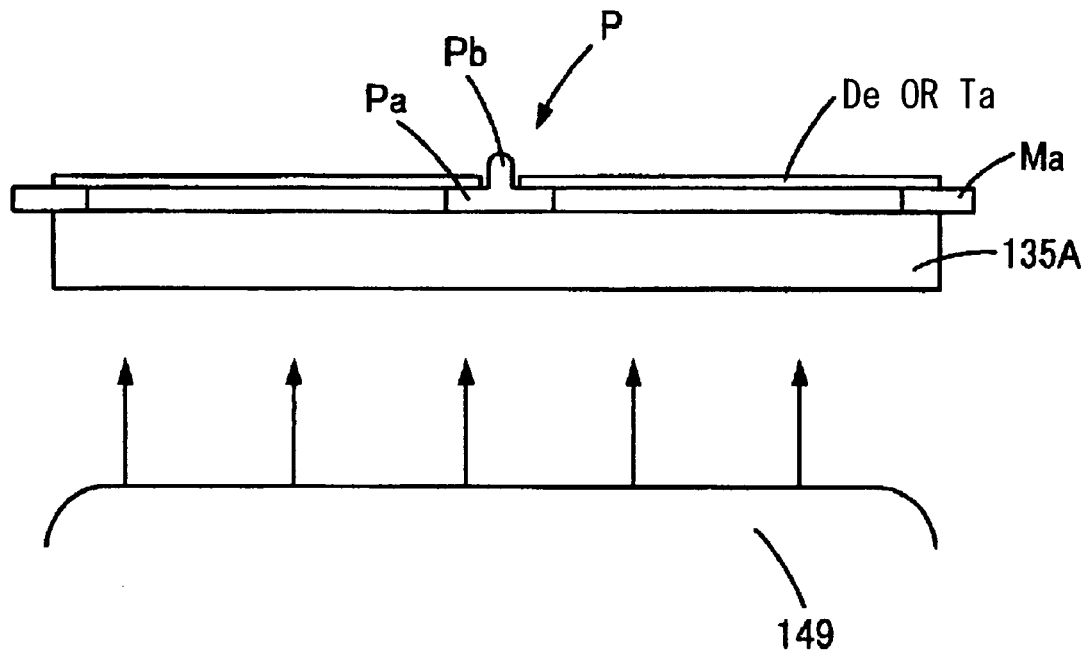
FIG. 10A is a figure showing an example of a mounting table applied to the optical disc production apparatus 300 of the present invention.

This embodiment explains one example of the above-described third embodiment. In the following explanation, FIG. 6A-E, FIGS. 10A and B are referred to FIG. 6A is a figure showing production steps of producing optical discs including two signal layers applicable to high-density recording. FIGS. 10A and B are figures showing an example of a mounting table applied to the optical disc production apparatus 300 of the present invention.

Figure 13:
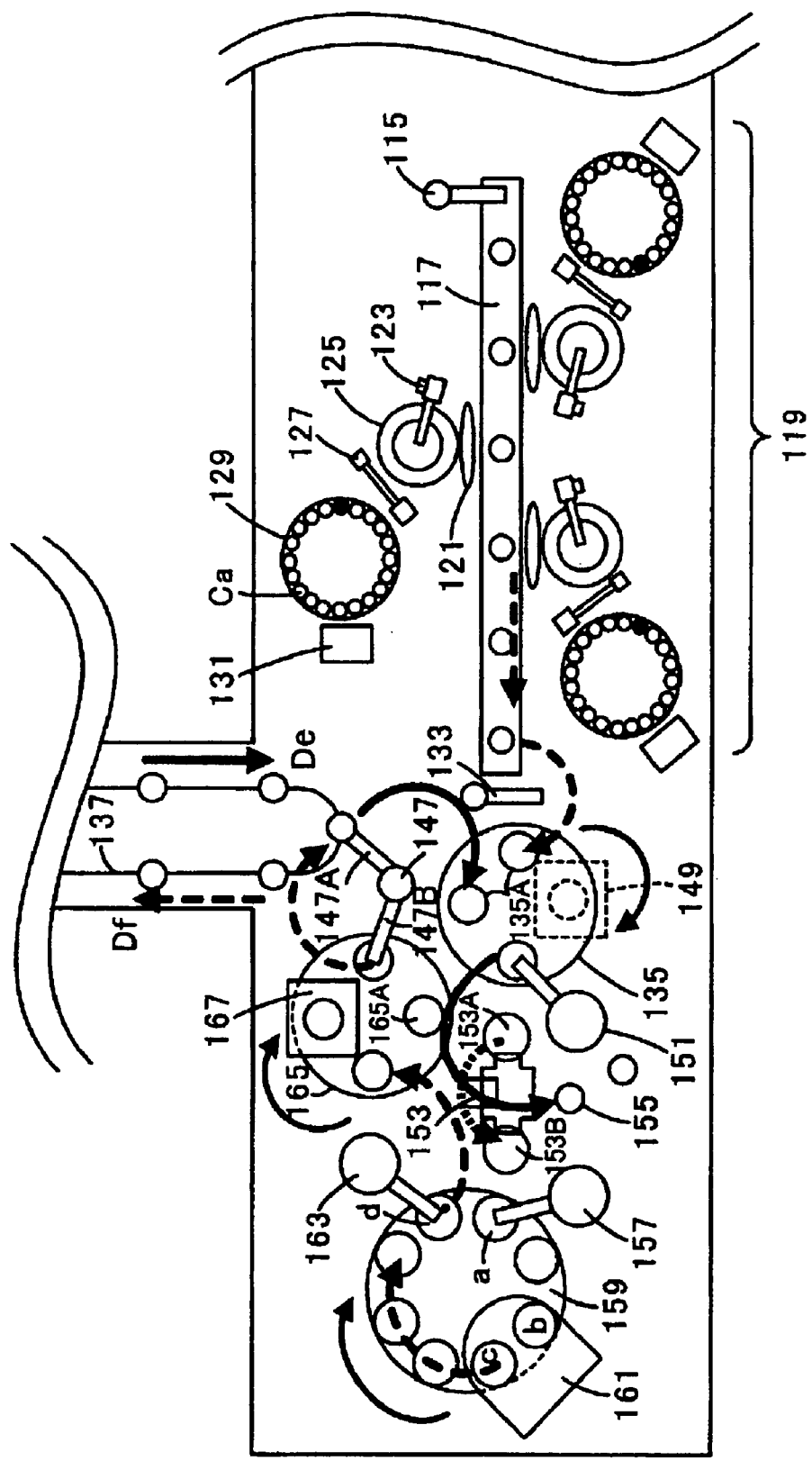
FIG. 13 is a figure showing other portions of the optical disc production apparatus 300 of the present invention.

As shown in FIG. 13, the turntable mechanism 135 has four mounting tables 135A at 90-degree intervals. The mounting table 135A is made from a heat-resistant light transmission material such as quartz, and the discs De are mounted on two of four facing mounting tables 135A. The printing/transferring discs Ta described above are transferred onto two empty mounting tables 135A on which the disc De is not mounted from the transportation line 117. As shown in FIG. 10A, on an upper surface of each mounting table 135A, there is a centering portion P, and on its outside edge portion, the mask member Ma is provided. The centering portion P is constituted from both a small disc portion Pa and a pin portion Pb. With respect to both cases of the disc De and the printing/transferring disc Ta, the outside edge portion of the disc is supported by the mask member Ma, and the inside edge portion of the disc is supported by the small disc portion Pa. It is preferable that the centering portion P be made from the same material as the mounting table 135A.

Figure 10B:
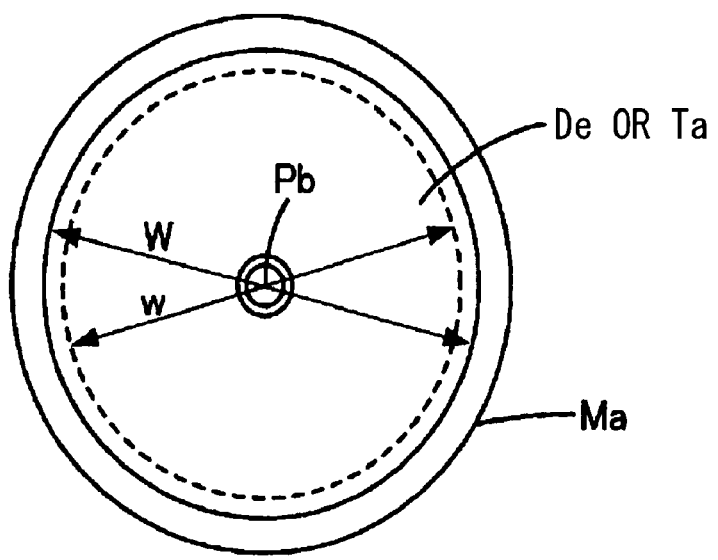
FIG. 10B is a figure showing an example of a mounting table applied to the optical disc production apparatus 300 of the present invention.

Along with intermittent rotation of the turntable mechanism 135, at a next position from a position where the printing/transferring disc Ta is transferred from the transportation line 137, as shown in FIGS. 6D and 6E, a first hardening step is performed in which hardening light such as UV from a hardening light radiation apparatus 149 provided under it is radiated on both the adhesive layer d of the disc De and the light transmission layer c2 of the printing/transferring disc Ta which are not shaded or covered by the mask member Ma (W>w≧0.9 W) such as shown in FIG. 10B. This first hardening step is conducted through the mounting table 135A. W is an outside diameter of the disc substrate D, and w is an inner diameter of the mask member Ma. In general, there is a tendency in which, when or after the rotation operation apparatus 125 conducts a high speed rotation operation, compared to the inside portion, a thickness of the outside portion of the adhesive layer d or the light transmission layer c2 is larger, and if it is adhered or combined, it causes an non-uniform layer thickness distribution. In this embodiment, it is possible to obtain the same effects as shown in the fourth embodiment in which the mask member Ma is applied, and moreover, the outside edge portion is maintained in a semi-cured or cured state by using the mask member Ma; therefore, it is possible to achieve a uniform layer thickness distribution between the inside edge portion and the outside edge portion when it is combined or adhered. It should be noted that in this embodiment, the light is not directly radiated on the adhesive layer d or the light transmission layer c2 and is radiated indirectly via the transparent mounting table 135A and the disc substrate D or the printing/transferring disc substrate T; therefore, it is possible to achieve the most preferable viscosity for combining or adhering both the adhesive layer d and the light transmission layer c2 together later.

Seventh Embodiment

Figure 11A:
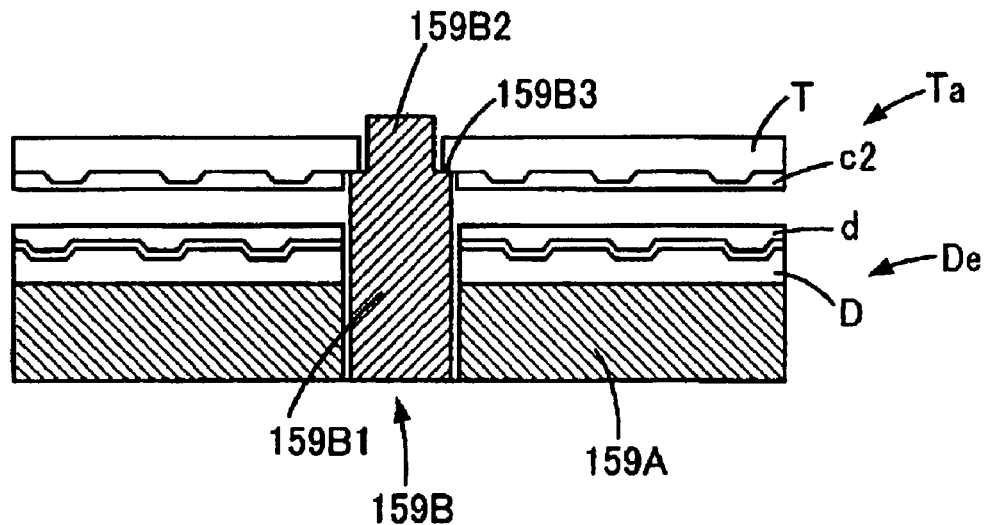
FIG. 11A is a figure showing an example of adhering discs applied to the optical disc production apparatus 300 of the present invention.

This embodiment explains one example of the above-described third embodiment. In this embodiment, FIGS. 11A and B are referred to. FIGS. 11A and B are figures which show one example of combining or adhering the disc that is applied for the optical disc production apparatus 300. Only differences from the third embodiment are explained below.

Figure 11B:
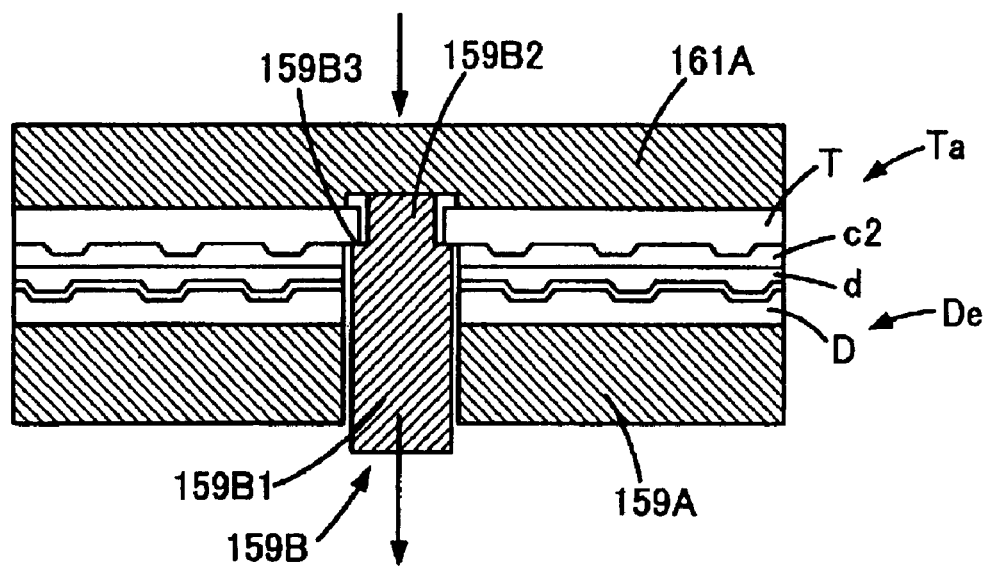
FIG. 11B is a figure showing an example of adhering discs applied to the optical disc production apparatus 300 of the present invention.

Referring to FIGS. 11A and B, an example of combining or adhering in a vacuum is explained. In FIG. 11B, the printing/transferring disc Ta is set at an upside and the disc De is set at a downside and both of them are combined or adhered together. The printing/transferring disc substrate T is going to be removed; therefore, it is not necessary to set the outside diameter, the inner diameter of the center aperture, and the like to be the same as the disc substrate D. Therefore, for example, when the inner diameter of the center aperture of the disc substrate D is 15 mm, it is possible to set the inner diameter of the printing/transferring disc Ta smaller such as 10 mm, and to combine or adhere in a state in which the printing/transferring disc Ta is at the upside and the disc De is at the downside. FIG. 11A shows a position a of the turntable mechanism 159 in FIG. 3. A center member 159B which extends upward in the figure from a center of the disc receiving base 159A on the turntable mechanism 159, provides a large diameter portion 159B1 and a small diameter portion 159B2, and a level difference portion 159B3 exists between the large diameter portion 159B1 and the small diameter portion 159B2. The large diameter portion 159B1 has a diameter which is rather smaller than the center aperture which is 15 mm of the disc substrate D, and the small diameter 159B2 has a diameter which is rather smaller than the center aperture which is 10 mm of the printing/transferring disc substrate T. The center member 159B is provided so as to move downward upon receiving a pressure from the upside in the figure and so as to return to the original position because of elasticity of a coil spring or the like which is not shown in figures upon being released from the pressure.

As shown in FIG. 11A, on the disc receiving base 159A, the disc De is mounted along with setting the adhesive layer d facing upward, and the printing/transferring disc Ta is supported by the level difference portion 159B3 of the center member 159B along with setting the light transmission layer c2 facing downward. In this state, in order to prevent the adhesive layer d and the light transmission layer c2 from contacting, the center member 159B is at a raised position, and the printing/transferring disc Ta is maintained at a position separated by a predetermined distance from the disc De. In this state, upon transporting to the position b or c of the turntable mechanism 159 in FIG. 3, a pressurization portion 161A moves downward as shown by an arrow and the printing/transferring disc Ta is pushed down in a downward direction in the figure. At this time the center member 159B moves down together. Along with this operation, as shown in FIG. 11B, the light transmission layer c2 of the printing/transferring disc Ta is pushed onto the adhesive layer d, and the adhesive layer d and the light transmission layer c2 are combined and adhered. It is possible that the pressurization portion 161A be such as a flat glass plate, a flat metal plate or a synthetic resin plate and a cylinder apparatus for pushing up and down the plate.

Eighth Embodiment

Figure 12A:
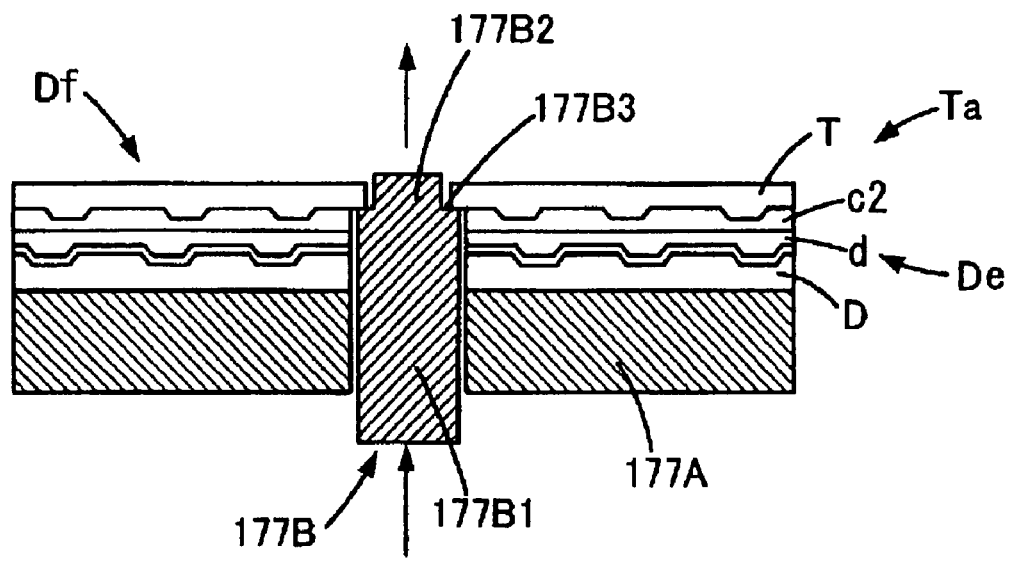
FIG. 12A is a figure showing an example of detaching, peeling or removing of a printing/transferring disc substrate applied to the optical disc production apparatus 300 of the present invention.

This embodiment explains one example of the above-described third embodiment. In this embodiment, FIGS. 12A and B are referred to. FIGS. 12A and B are figures showing an example of detaching, peeling or removing of the printing/transferring disc substrate applied to the optical disc production apparatus 300. Only differences from the third embodiment are explained below.

The peeling apparatuses 177 and 179 of the peeling mechanism 171 have the same constitution; therefore only the peeling apparatus 177 is explained. The disc receiving base 177A of the peeling apparatus 177 has multiple suction apertures connected to a suction apparatus which is not shown in the figures and is possible to suck the disc Df which is going to be mounted by applying a predetermined or larger sucking force. At a center of the disc receiving base 177A, a center member 177 extending upward in the figure is provided, similar to the center member 159B shown in FIGS. 11A and B, a large diameter portion 177B1 and a small diameter portion 177B2 are provided, and a level difference portion 177B3 exists between the large diameter portion 177B1 and the small diameter portion 177B2. The center member 177B is able to move up and down by using a driving apparatus which is not shown in the figures. The large diameter 177B1 has a diameter which is rather smaller than the center aperture which is 15 mm of the disc substrate D, and the small diameter 177B2 has a diameter which is rather smaller than the center aperture which is 10 mm of the printing/transferring disc substrate T.

Figure 12B:
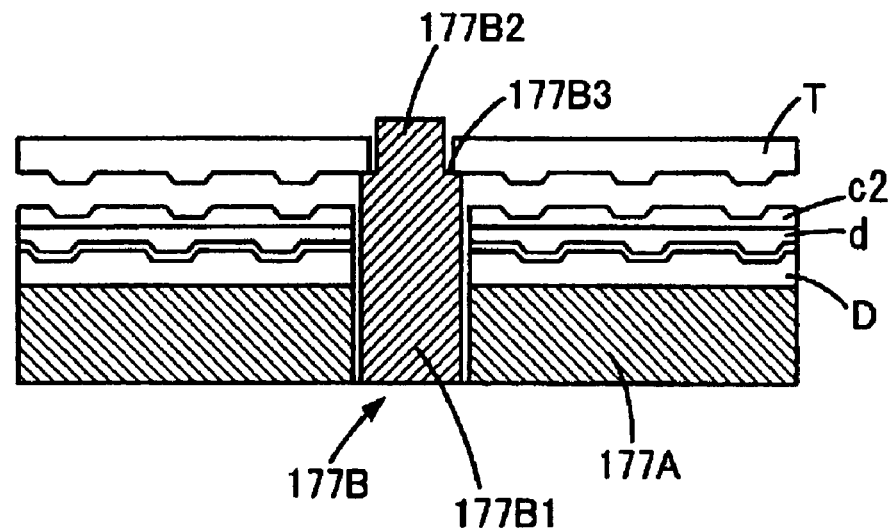
FIG. 12B is a figure showing an example of detaching, peeling or removing of a printing/transferring disc substrate applied to the optical disc production apparatus 300 of the present invention.

As shown in FIG. 12A, when the disc Df which is made by combining or adhering both the disc De which has the adhesive layer d facing upward and the printing/transferring disc Ta which has the light transmission layer c2 facing downward, is mounted on the disc receiving base 177A, the driving apparatus which is not shown in figures raises the center member 177B. By raising the center member 177B, a force by which the level difference portion 177B raises the printing/transferring disc T upward is generated. However, as described above, the disc De is sucked by the disc receiving base 177A; therefore, as shown in FIG. 12B, peeling is caused between the printing/transferring disc substrate T and the light transmission layer c2, that is, a portion which has the smallest adhesive strength. This peeling is caused from an area around the center aperture of the printing/transferring disc Ta and peeling is conducted at a time; however, if it is rather difficult to peel, as disclosed in the invention of the above-described Japanese Patent Application, First Publication No. 09-63127, it is possible to blow or discharge the compressed air to a portion of both the printing/transferring disc substrate T and the light transmission layer c2 from the center member 177B; and therefore, it is possible to peel at a time by using the force of the compressed air.

INDUSTRIAL APPLICABILITY

In accordance with the present invention, it is possible to produce both a optical disc including one signal layer which is applicable to high-density recording with high quality, and an optical disc including two signal layers which is applicable to high-density recording with high quality, selectively or in accordance with the user's designation by using one apparatus, and moreover, it is possible to provide a production apparatus which is economically advantageous.

The invention claimed is:

1. An optical disc production apparatus which produces an optical disc that has one or two signal layers, comprising:
   a first signal layer forming mechanism which forms a first signal layer on a disc substrate;
   a layer forming mechanism which selectively forms a first reflection layer on the first signal layer on the disc substrate or a second reflection layer on a second signal layer that is formed on the first reflection layer;
   a second signal layer forming mechanism which forms the second signal layer on the disc substrate on which the first reflection layer is formed on the first signal layer;
   a light transmission layer forming mechanism which forms a light transmission layer on the first reflection layer or on the second reflection layer;
   a first transportation mechanism in a looped shape which is provided close to the first signal layer forming mechanism, the layer forming mechanism, the second signal layer forming mechanism and the light transmission layer forming mechanism, and which transports the disc substrate;
   a second transportation mechanism provided close to the first transport mechanism that transports the disc substrate on which the first reflection layer is formed on the first signal layer or the disc substrate on which the second reflection layer is formed to the light transmission layer forming mechanism;
   a first transfer mechanism which transfers the disc substrate on which the first signal layer is formed to the first transportation mechanism;
   a second transfer mechanism that selectively transfers the disc substrate transferred by the first transportation mechanism on which the first reflection layer is formed on the first signal layer or the disc substrate on which the second reflection layer is formed to the second transportation mechanism; and
   a third transfer mechanism that transfers the disc substrate transferred by the first transportation mechanism on which the first reflection layer is formed on the first signal layer to the second signal layer forming mechanism, and that transfers the disc substrate on which the second signal layer is formed by the second signal layer forming mechanism to the first transportation mechanism.

2. The optical disc production apparatus according to claim 1, wherein, when the optical disc with one signal layer is produced:
   the second signal layer forming mechanism is stopped;
   the layer forming mechanism forms only the first reflection layer on the disc substrate;
   the second transfer mechanism transfers the disc substrate on which the first reflection layer is formed to the second transportation mechanism; and
   the light transmission layer forming mechanism forms the light transmission layer which is a cover layer on the first reflection layer of the disc substrate.

3. The optical disc production apparatus according to claim 1, wherein, when the optical disc with two signal layers is produced, in a portion of an interval of the first transportation mechanism, both the disc substrate on which the first signal layer is formed and the disc substrate on which the second signal layer is further formed are transported alternatively.

4. The optical disc production apparatus according to claim 1, wherein, the light transmission layer forming mechanism further comprises:
   a rotation operation apparatus which extends liquid material for forming the light transmission layer on the first reflection layer or the second reflection layer;
   a first hardening light radiation apparatus for semi-hardening or hardening the light transmission layer in a liquid state except for an outside edge portion; and
   a second hardening light radiation apparatus for hardening the overall light transmission layer.

5. The optical disc production apparatus according to claim 1, wherein:
   the second transportation structure is constituted from both a first transportation line and a second transportation line which independently conduct transportation operations;
   the light transmission layer forming mechanism is provided at the first transportation line;
   the second transportation line comprises a mechanism for forming a hard coat layer on the light transmission layer which is the cover layer;
   the first transport line comprises both a fourth transfer mechanism and a disc mounting portion at an end portion of the first transport line; and
   the fourth transfer mechanism transfers the disc substrate on the first transportation line on which the light transmission layer that is the cover layer is formed to the second transportation line while normally conducting operations, transfers and mounts the disc substrate on which the light transmission layer is formed from the first transportation line to the disc mounting portion when a problem occurs, and transfers the disc substrate from the disc mounting portion to the second transportation line when the problem is resolved.

6. An optical disc production apparatus for producing a disc substrate with one or two signal layers comprising:
   a liquid material supplying mechanism which supplies liquid material to a disc substrate;
   a first rotation operation apparatus which extends the liquid material supplied to the disc substrate by applying centrifugal force in order to form a light transmission layer;
   a second rotation operation apparatus which rotates the disc substrate on which the light transmission layer is formed at a rotation speed which is lower than a rotation speed of the first rotation operation apparatus;
   a first hardening light-radiation apparatus which radiates hardening light on the disc substrate mounted on the second rotation operation apparatus;
   a mask portion in a ring shape which is made from a light blocking material that substantially blocks the hardening light, and has both an inner diameter that is larger than 90% of an outside diameter of the disc substrate and an outside diameter that is larger than the outside diameter of the disc substrate;
   a mask transfer mechanism which transfers the mask portion to a predetermined position which is close to a front surface of the disc substrate when the hardening light is radiated from the first hardening light radiation apparatus in order to prevent the hardening light from substantially radiating on an outside edge portion that is larger than 90% of the light transmission layer extended on the disc substrate, and transfers from the predetermined position to another position after finishing radiating the hardening light;
   a second hardening light radiation apparatus for hardening an overall surface of the light transmission layer extended on the disc substrate; and
   a transportation mechanism which transports the disc substrate from the first hardening light radiation apparatus to the second hardening light radiation apparatus while the light transmission layer on the outside edge portion is unhardened.

7. The optical disc production apparatus according to claim 6, wherein:
   the mask transfer mechanism comprises:
      a mask supporting portion which supports the mask portion;
      a base portion which is fixed to a fixed structural object;
      a vertically movable portion which is fixed to the base portion and which is vertically movable against the base portion and moves up and down the mask supporting portion; and
      a gyrate drive portion which rotates the mask supporting portion.

8. The optical disc production apparatus according to claim 6, further comprising around the liquid material supplying mechanism:
   a cap mounting table on which a plurality of cap members that cover a center aperture of the disc substrate are mounted; and
   a cap transfer apparatus which transfers the cap member mounted on the cap mounting table and covers the center aperture of the disc substrate mounted on the first rotation apparatus with the cap member, wherein:
   the liquid material supplying mechanism supplies the liquid material at a center or close to the center of the cap member which covers the center aperture of the disc substrate; and
   the cap transfer apparatus, with respect to each of the disc substrate or a plurality of the disc substrates, replaces the cap member which is mounted on the center aperture of the disc substrate with another cap member which is newly mounted on the cap mounting table.

9. The optical disc production apparatus according to claim 6, wherein:
   a pair of the second rotation operation apparatuses are arranged at positions at a same distance from the first hardening light radiation apparatus which is one apparatus; and
   the first hardening light radiation apparatus radiates the hardening light on each of the disc substrate mounted on the pair of the second rotation operation apparatuses alternatively.

10. The optical disc production apparatus according to claim 6, wherein:
   the second hardening light radiation apparatus is arranged above a transportation line which transports the disc substrate on which the light transmission layer is formed; and
   a shutter portion for preventing the transportation line from being radiated by the hardening light from the second hardening light radiation apparatus is further provided.

11. An optical disc production apparatus for producing a disc substrate with one or two signal layers comprising:
   a first liquid material supplying apparatus which supplies a first liquid material onto a first reflection layer which is formed on a first signal layer of a disc substrate;
   a first rotation operation apparatus which rotates the disc substrate at a high speed and extends the first liquid material on the first reflection layer of the disc substrate by applying centrifugal force in order to form a transparent first light transmission layer;

a second liquid material supplying apparatus which supplies a second liquid material onto a second signal layer of a printing/transferring disc substrate;

a second rotation operation apparatus which rotates the printing/transferring disc substrate at a high speed and extends the second liquid material on the second signal layer of the printing/transferring disc substrate by applying centrifugal force in order to form a transparent light-transmissive printing/transferring layer;

a mask portion in a ring shape which is made from a light blocking material that substantially does not transmit the hardening light and that covers an area which is substantially the same as an outside edge portion of the disc substrate or the printing/transferring disc substrate;

a first hardening light radiation apparatus which radiates hardening light on the disc substrate or the printing/transferring disc substrate, which radiates the hardening light through an inner diameter blank portion of the mask portion, and which semi-hardens or hardens an area of the first light transmission layer or the light-transmissive printing/transferring layer that positions at the inner diameter blank portion;

a combining mechanism which arranges both the first light transmission layer formed on the disc substrate and the light-transmissive printing/transferring layer formed on the printing/transferring disc substrate facing each other in order to combine and adhere;

a combining mechanism which arranges the light-transmissive printing/transferring layer to face the first light transmission layer while the outside edge portion outside the inner diameter blank portion is unhardened and which combines the disc substrate and the printing/transferring disc substrate together;

a transfer mechanism which transfers the disc substrate or the printing/transferring disc substrate to the first hardening light radiation apparatus while an outside edge portion of the first light transmission layer or the light-transmissive printing/transferring layer is unhardened;

a second hardening light radiation apparatus which radiates hardening light overall on both the first light transmission layer and the light-transmissive printing/transferring layer from one side or both sides of the disc substrate and the printing/transferring disc substrate which are combined; and a peeling apparatus which peels the printing/transferring disc substrate in order to print the second signal layer on the disc substrate.

12. The optical disc production apparatus according to claim 11, further comprising a turntable mechanism which comprises a plurality of mounting portions that mount the disc substrate and the printing/transferring disc substrate alternatively, wherein:

the mounting portion is made from a material which transmits the hardening light;

the mask portion is provided at the mounting portion; and the mask portion supports an outside edge portion of the disc substrate or the printing/transferring disc substrate.

13. The optical disc production apparatus according to claim 11, wherein the mask portion which is in a ring shape has both an inner diameter which is larger than 90% of an outside diameter of the disc substrate or the printing/transferring disc substrate and an outside diameter which is larger than the outside diameter of the disc substrate or the printing/transferring disc substrate.

14. The optical disc production apparatus according to claim 11, wherein the combining mechanism provides a maintaining mechanism which maintains both the first light transmission layer of the disc substrate and the light-transmissive printing/transferring layer of the printing/transferring disc substrate facing each other along with keeping a predetermined distance, and overlaps both the first light transmission layer of the disc substrate and the light-transmissive printing/transferring layer of the printing/transferring disc substrate.

15. The optical disc production apparatus according to claim 11, wherein the hardening light which is radiated from the first hardening light radiation apparatus transmits through the disc substrate or the printing/transferring disc substrate, and semi-hardens or hardens the first light transmission layer or the light-transmissive printing/transferring layer.

* * * * *